(12) United States Patent
Han et al.

(10) Patent No.: US 12,347,171 B2
(45) Date of Patent: Jul. 1, 2025

(54) MODEL UPDATE METHOD AND RELATED APPARATUS

(71) Applicant: HUAWEI TECHNOLOGIES CO., LTD., Shenzhen (CN)

(72) Inventors: Jifei Han, Shenzhen (CN); Zhilan Hu, Beijing (CN); Bo Bai, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 396 days.

(21) Appl. No.: 17/898,948

(22) Filed: Aug. 30, 2022

(65) Prior Publication Data

US 2022/0415023 A1    Dec. 29, 2022

Related U.S. Application Data

(63) Continuation of application No. PCT/CN2021/079005, filed on Mar. 4, 2021.

(30) Foreign Application Priority Data

Mar. 4, 2020   (CN) .......................... 202010143004.0

(51) Int. Cl.
*G06K 9/00* (2022.01)
*G06V 10/74* (2022.01)
(Continued)

(52) U.S. Cl.
CPC .......... *G06V 10/774* (2022.01); *G06V 10/761* (2022.01); *G06V 10/762* (2022.01); *G06V 10/776* (2022.01); *G06V 10/82* (2022.01)

(58) Field of Classification Search
CPC .. G06V 10/774; G06V 10/761; G06V 10/762; G06V 10/776; G06V 10/82;
(Continued)

(56) References Cited

U.S. PATENT DOCUMENTS 8,918,396 B2 * 12/2014 Nagano ................... G06F 16/41
                                                                  706/20
10,671,884 B2 * 6/2020 Walters ................... G06T 7/254
(Continued)

FOREIGN PATENT DOCUMENTS

CN         110263837 A    9/2019
CN         110309853 A    10/2019
(Continued)

OTHER PUBLICATIONS

Lin et al., "A Bottom-up Clustering Approach to Unsupervised Person Re-identification", vol. 33, No. 01: AAAI-19, AAI-19, EAAI-20, 2019, 8 pages.
(Continued)

*Primary Examiner* — Shervin K Nakhjavan
(74) *Attorney, Agent, or Firm* — Maier & Maier, PLLC

(57) ABSTRACT

A method includes: performing a plurality of times of first clustering processing on a plurality of training images based on a plurality of target features to obtain a plurality of first clustering results, where each of the plurality of first clustering results corresponds to one silhouette coefficient, and the silhouette coefficient indicates cluster quality; determining a first target clustering result based on the silhouette coefficients, where the first target clustering result includes M clustering categories; and performing second clustering processing on the plurality of training images based on the plurality of target features to obtain a second clustering result, where a quantity of clustering categories included in the second clustering result is M.

19 Claims, 7 Drawing Sheets

(51) Int. Cl.
*G06V 10/762* (2022.01)
*G06V 10/774* (2022.01)
*G06V 10/776* (2022.01)
*G06V 10/82* (2022.01)

(58) Field of Classification Search
CPC ...... G06V 40/10; G06V 20/52; G06N 3/0464;
G06N 3/084; G06N 3/088; G06N 3/045;
G06F 18/22; G06F 18/232
See application file for complete search history.

(56) References Cited

U.S. PATENT DOCUMENTS

| | | | |
|---|---|---|---|
| 10,679,330 B2* | 6/2020 | Bhatt | G06T 7/0002 |
| 10,748,036 B2* | 8/2020 | Tu | G06T 7/11 |
| 11,409,642 B2* | 8/2022 | Park | G06N 20/00 |
| 11,455,830 B2* | 9/2022 | Chen | G06V 10/82 |
| 11,903,730 B1* | 2/2024 | Chaudhri | G06N 3/0464 |
| 12,097,050 B2* | 9/2024 | Baek | A61B 5/7264 |
| 2018/0181808 A1 | 6/2018 | Sridharan | |
| 2019/0156154 A1 | 5/2019 | Tu et al. | |
| 2019/0220967 A1 | 7/2019 | Bhatt et al. | |
| 2021/0326708 A1* | 10/2021 | Han | G06V 10/7715 |
| 2024/0265561 A1* | 8/2024 | Gallo | G06T 15/10 |

FOREIGN PATENT DOCUMENTS

| | | | |
|---|---|---|---|
| CN | 110414462 A | 11/2019 | |
| CN | 109829433 B | 6/2021 | |
| WO | WO-2018137358 A1 * | 8/2018 | ........... G06F 16/583 |
| WO | WO-2020155627 A1 * | 8/2020 | ............... G06N 3/04 |

OTHER PUBLICATIONS

Deng et al., "Image-Image Domain Adaptation with Preserved Self-Similarity and Domain-Dissimilarity for Person Re-identification", CVPR 2018, 10 pages.
Fu et al., "Self-similarity Grouping: A Simple Unsupervised Cross Domain Adaptation Approach for Person Re-dentification", ICCV 2019, 10 pages.
Caron et al., "Deep Clustering for Unsupervised Learning of Visual Features", ECCV 2018, 18 pages.
Murez et al., "Image to Image Translation for Domain Adaptation", CVPR 2017, 10 pages.
Ristani et al., "Performance Measures and a Data Set for Multi-Target, Multi-Camera Tracking", Computer Vision, ECCV 2016 Workshops, 18 pages.
Wei et al., "Person Transfer GAN to Bridge Domain Gap for Person Re-Identification", CVPR 2018, 10 pages.
Zheng et al., "Scalable Person Re-identification: A Benchmark", ICCV 2015, 9 pages.

* cited by examiner

MODEL UPDATE METHOD AND RELATED APPARATUS

CROSS-REFERENCE TO RELATED APPLICATIONS

This application is a continuation of International Application No. PCT/CN2021/079005, filed on Mar. 4, 2021, which claims priority to Chinese Patent Application No. 202010143004.0, filed on Mar. 4, 2020. The disclosures of the aforementioned applications are hereby incorporated by reference in their entireties.

TECHNICAL FIELD

The embodiments relate to the field of artificial intelligence, a model update method, and a related apparatus.

BACKGROUND

With people's increasing attention to social public security and development of video capturing technologies and large-scale data storage technologies, a large quantity of surveillance cameras may be used in densely-populated areas where a public security problem is prone to occur. An increasing quantity of surveillance videos are difficult to be manually processed. Therefore, a requirement for re-recognizing a pedestrian and the like in a surveillance video by using a computer emerges. Re-recognition is recognizing, in a surveillance video, a pedestrian that has appeared in a surveillance network. For example, in the surveillance network, the pedestrian appears under different cameras. A pedestrian re-identification task is to identify the pedestrian in the surveillance network, and re-identify, in a scenario of another camera, the target pedestrian that has appeared in the surveillance network. That is, the task is about how to re-identify a pedestrian when some candidate targets are given.

Thanks to development of deep learning, performance of image retrieval and recognition tasks has been greatly improved. However, an existing deep learning solution depends on data. In a same scenario, a large amount of training data can be used to obtain a deep model with excellent performance in a current scenario. However, during actual deployment of the deep model, scenario and training data distribution may be inconsistent. Consequently, performance of the deep model greatly deteriorates in a deployment scenario. To resolve a problem that performance deteriorates during deployment in a target scenario, a pair of unlabeled samples in the target scenario may be used for training, to improve performance in the target scenario.

In the conventional technology, in a process in which the pair of unlabeled samples in the target scenario is used for training, each sample is considered as an independent clustering category at the beginning, and a quantity of clustering categories may be reduced in each iteration according to a minimum distance principle. As iteration proceeds, a quantity of clustering categories decreases, and performance of the model is gradually improved based on the training. Finally, models corresponding to different obtained quantities of clustering categories are verified, to determine a model with optimal performance. In the foregoing verification process, the models corresponding to the different obtained quantities of clustering categories need to be verified based on labeled samples. However, in some scenarios, the labeled samples are often difficult to obtain.

SUMMARY

The embodiments may provide a model update method, and the method includes:
obtaining a neural network model and a plurality of training images;
performing feature extraction on the plurality of training images by using the neural network model to obtain a plurality of target features;
performing a plurality of times of first clustering processing on the plurality of training images based on the plurality of target features to obtain a plurality of first clustering results, where each of the plurality of first clustering results corresponds to one silhouette coefficient, and the silhouette coefficient indicates clustering quality;
determining a first target clustering result from the plurality of first clustering results based on a plurality of silhouette coefficients corresponding to the plurality of first clustering results, where the first target clustering result includes M clustering categories; and
performing second clustering processing on the plurality of training images based on the plurality of target features to obtain a second clustering result, and updating a parameter of the neural network model according to a first loss function, where a quantity of clustering categories included in the second clustering result is M.

In an optional implementation of the first aspect, the silhouette coefficient is calculated based on a degree of inter-category separation and a degree of intra-category cohesion. The degree of inter-category separation indicates a distance between different clustering categories. The degree of intra-category cohesion indicates a distance between different training images corresponding to a same clustering category.

In an optional implementation of the first aspect, a silhouette coefficient corresponding to the first target clustering result is greater than a silhouette coefficient corresponding to a clustering result other than the first target clustering result in the plurality of first clustering results.

In an optional implementation of the first aspect, the performing a plurality of times of first clustering processing on the plurality of training images based on the plurality of target features includes:
performing the plurality of times of first clustering processing on the plurality of training images based on the plurality of target features and updating the parameter of the neural network model according to a second loss function after each time of first clustering processing.

In an optional implementation of the first aspect, the updating the parameter of the neural network model according to a second loss function after each time of first clustering processing includes:
updating the parameter of the neural network model according to the second loss function after each time of first clustering processing, to reduce, in a first clustering result obtained after a next time of first clustering processing, a variance of first similarity distribution between each of the plurality of training images and a plurality of clustering categories included in the first clustering result.

In an optional implementation of the first aspect, the plurality of times of first clustering processing may include an $i^{th}$ time of clustering processing and a $j^{th}$ time of clustering processing; the $j^{th}$ time of clustering processing is after the $i^{th}$ time of clustering processing; and the performing a plurality of times of first clustering processing on the plurality of training images based on the plurality of target features includes:

obtaining a second similarity between all of the plurality of target features when the $i^{th}$ time of clustering processing and the $j^{th}$ time of clustering processing are performed, where the second similarity includes image feature similarities and spatio-temporal constraint weights that are between each of the plurality of target features, a spatio-temporal constraint weight when the $j^{th}$ clustering processing is performed is greater than a spatio-temporal constraint weight when the $i^{th}$ clustering processing is performed, and a spatio-temporal constraint weight indicates a capability of affecting the second similarity between the target features by a spatio-temporal constraint; and performing the $i^{th}$ time of clustering processing and the $j^{th}$ time of clustering processing on the plurality of training images based on the second similarity, where i and j are positive integers.

In an optional implementation of the first aspect, the performing a plurality of times of first clustering processing on the plurality of training images based on the plurality of target features includes:

obtaining the second similarity between all of the plurality of target features when the $i^{th}$ time of clustering processing and the $j^{th}$ time of clustering processing are performed, where the second similarity includes the image feature similarities and the spatio-temporal constraint weights that are between each of the plurality of target features; and performing the plurality of times of first clustering processing on the plurality of training images based on the second similarity and updating the spatio-temporal constraint weights between all of the plurality of target features based on a corresponding first clustering result after each time of first clustering processing.

In an optional implementation of the first aspect, the second loss function includes a triplet loss function.

In an optional implementation of the first aspect, the updating a parameter of the neural network model according to a first loss function includes:

updating the parameter of the neural network model according to the triplet loss function and the second loss function, to reduce, in a second clustering result obtained after a next time of second clustering processing, a variance of first similarity distribution between each of the plurality of training images and a plurality of clustering categories included in the second clustering result, and increase a distance between different clustering categories in the second clustering result obtained after the next time of clustering processing.

According to a second aspect, an apparatus may include:
an obtaining module, configured to obtain a neural network model and a plurality of training images;
a feature extraction module, configured to perform feature extraction on the plurality of training images by using the neural network model to obtain a plurality of target features;
a first clustering module, configured to perform a plurality of times of first clustering processing on the plurality of training images based on the plurality of target features to obtain a plurality of first clustering results, where each of the plurality of first clustering results corresponds to one silhouette coefficient, and the silhouette coefficient indicates clustering quality;
a determining module, configured to determine a first target clustering result from the plurality of first clustering results based on a plurality of silhouette coefficients corresponding to the plurality of first clustering results, where the first target clustering result includes M clustering categories; and a second clustering module, configured to perform second clustering processing on the plurality of training images based on the plurality of target features to obtain a second clustering result, and update a parameter of the neural network model according to a first loss function, where a quantity of clustering categories included in the second clustering result is M.

In an optional implementation of the second aspect, the silhouette coefficient is calculated based on a degree of inter-category separation and a degree of intra-category cohesion. The degree of inter-category separation indicates a distance between different clustering categories. The degree of intra-category cohesion indicates a distance between different training images corresponding to a same clustering category.

In an optional implementation of the second aspect, a silhouette coefficient corresponding to the first target clustering result is greater than a silhouette coefficient corresponding to a clustering result other than the first target clustering result in the plurality of first clustering results.

In an optional implementation of the second aspect, the first clustering module is configured to:
perform the plurality of times of first clustering processing on the plurality of training images based on the plurality of target features and update the parameter of the neural network model according to a second loss function after each time of first clustering processing.

In an optional implementation of the second aspect, the first clustering module is configured to:
update the parameter of the neural network model according to the second loss function after each time of first clustering processing, to reduce, in a first clustering result obtained after a next time of first clustering processing, a variance of first similarity distribution between each of the plurality of training images and a plurality of clustering categories included in the first clustering result.

In an optional implementation of the second aspect, the plurality of times of first clustering processing may include an $i^{th}$ time of clustering processing and a $j^{th}$ time of clustering processing; the $j^{th}$ time of clustering processing is after the $i^{th}$ time of clustering processing; and the first clustering module is configured to:
obtain a second similarity between all of the plurality of target features when the $i^{th}$ time of clustering processing and the $j^{th}$ time of clustering processing are performed, where the second similarity includes image feature similarities and spatio-temporal constraint weights that are between each of the plurality of target features, a spatio-temporal constraint weight when the $j^{th}$ clustering processing is performed is greater than a spatio-temporal constraint weight when the $i^{th}$ clustering processing is performed, and a spatio-temporal constraint weight indicates a capability of affecting the second similarity between the target features by a spatio-temporal constraint; and perform the $i^{th}$ time of clustering processing and the $j^{th}$ time of clustering processing on the plurality of training images based on the second similarity, where i and j are positive integers.

In an optional implementation of the second aspect, the first clustering module is configured to:
obtain the second similarity between all of the plurality of target features when the $i^{th}$ time of clustering processing and the $j^{th}$ time of clustering processing are performed, where the second similarity includes the image feature similarities and the spatio-temporal constraint weights that are between each of the plurality of target features; and perform the plurality of times of first clustering processing on the plurality of training images based on the second similarity and update the spatio-temporal constraint weights between all of the plurality of target features based on a corresponding first clustering result after each time of first clustering processing.

In an optional implementation of the second aspect, the second loss function includes a triplet loss function.

In an optional implementation of the second aspect, the second clustering module is configured to:

update the parameter of the neural network model according to the triplet loss function and the second loss function, to reduce, in a second clustering result obtained after a next time of second clustering processing, a variance of first similarity distribution between each of the plurality of training images and a plurality of clustering categories included in the second clustering result, and increase a distance between different clustering categories in the second clustering result obtained after the next time of clustering processing.

According to a third aspect, an embodiment may provide a training device. The training device may include a memory, a processor, and a bus system. The memory is configured to store a program, and the processor is configured to execute the program in the memory, including the following steps:

obtaining a neural network model and a plurality of training images;

performing feature extraction on the plurality of training images by using the neural network model to obtain a plurality of target features;

performing a plurality of times of first clustering processing on the plurality of training images based on the plurality of target features to obtain a plurality of first clustering results, where each of the plurality of first clustering results corresponds to one silhouette coefficient, and the silhouette coefficient indicates clustering quality;

determining a first target clustering result from the plurality of first clustering results based on a plurality of silhouette coefficients corresponding to the plurality of first clustering results, where the first target clustering result includes M clustering categories; and performing second clustering processing on the plurality of training images based on the plurality of target features to obtain a second clustering result, and updating a parameter of the neural network model according to a first loss function, where a quantity of clustering categories included in the second clustering result is M.

In the third aspect, the processor may be further configured to perform the steps performed by an execution device in the possible implementations of the first aspect. For details, refer to the first aspect. Details are not described herein again.

According to a fourth aspect, an embodiment may provide a computer-readable storage medium. The computer-readable storage medium stores a computer program; and when the computer program runs on a computer, the computer is enabled to perform the model update method according to the optional implementations of the first aspect.

According to a fifth aspect, an embodiment may provide a computer program. When the computer program runs on a computer, the computer performs the model update method according to the optional implementations of the first aspect.

According to a sixth aspect, a chip system may include a processor, configured to support an execution device or a training device to implement functions in the foregoing aspects, for example, sending or processing data and/or information in the foregoing method. In a possible implementation, the chip system further includes a memory. The memory is configured to store program instructions and data that are necessary for the execution device or the training device. The chip system may include a chip or may include a chip and another discrete device.

An embodiment may provide the model update method. The method includes: obtaining the neural network model and the plurality of training images; performing feature extraction on the plurality of training images by using the neural network model to obtain the plurality of target features; performing the plurality of times of first clustering processing on the plurality of training images based on the plurality of target features to obtain the plurality of first clustering results, where each of the plurality of first clustering results corresponds to one silhouette coefficient, and the silhouette coefficient indicates clustering quality; determining the first target clustering result from the plurality of first clustering results based on the plurality of silhouette coefficients corresponding to the plurality of first clustering results, where the first target clustering result includes the M clustering categories; and performing the second clustering processing on the plurality of training images based on the plurality of target features to obtain the second clustering result, and updating the parameter of the neural network model according to the first loss function, where the quantity of clustering categories included in the second clustering result is M. In the foregoing manner, an optimal quantity of clusters categories does not need to be determined by verifying, based on labeled samples, models corresponding to different obtained quantities of clustering categories, and the optimal quantity of clustering categories may be directly selected based on the first clustering result.

DETAILED DESCRIPTION OF THE EMBODIMENTS

The following describes embodiments with reference to the accompanying drawings. Terms used in an implementation part of the embodiments are intended only to explain the embodiments, and are not intended as limiting.

The following describes the embodiments with reference to the accompanying drawings. A person of ordinary skill in the art may understand that, with technology development and emergence of a new scenario, the solutions provided in the embodiments are also applicable to a similar problem.

In the embodiments and accompanying drawings, the terms "first", "second", and so on are intended to distinguish between similar objects but do not necessarily indicate an order or sequence. It should be understood that the terms used in such a way are interchangeable in proper circumstances, which is merely a discrimination manner that is used when objects having a same attribute are described in the embodiments. In addition, the terms "include", "have", and any other variant thereof are intended to cover a non-exclusive inclusion, so that a process, method, system, product, or device that includes a list of units is not necessarily limited to those units but may include other units that are not expressly listed or are inherent to the process, method, product, or device.

Figure 1:
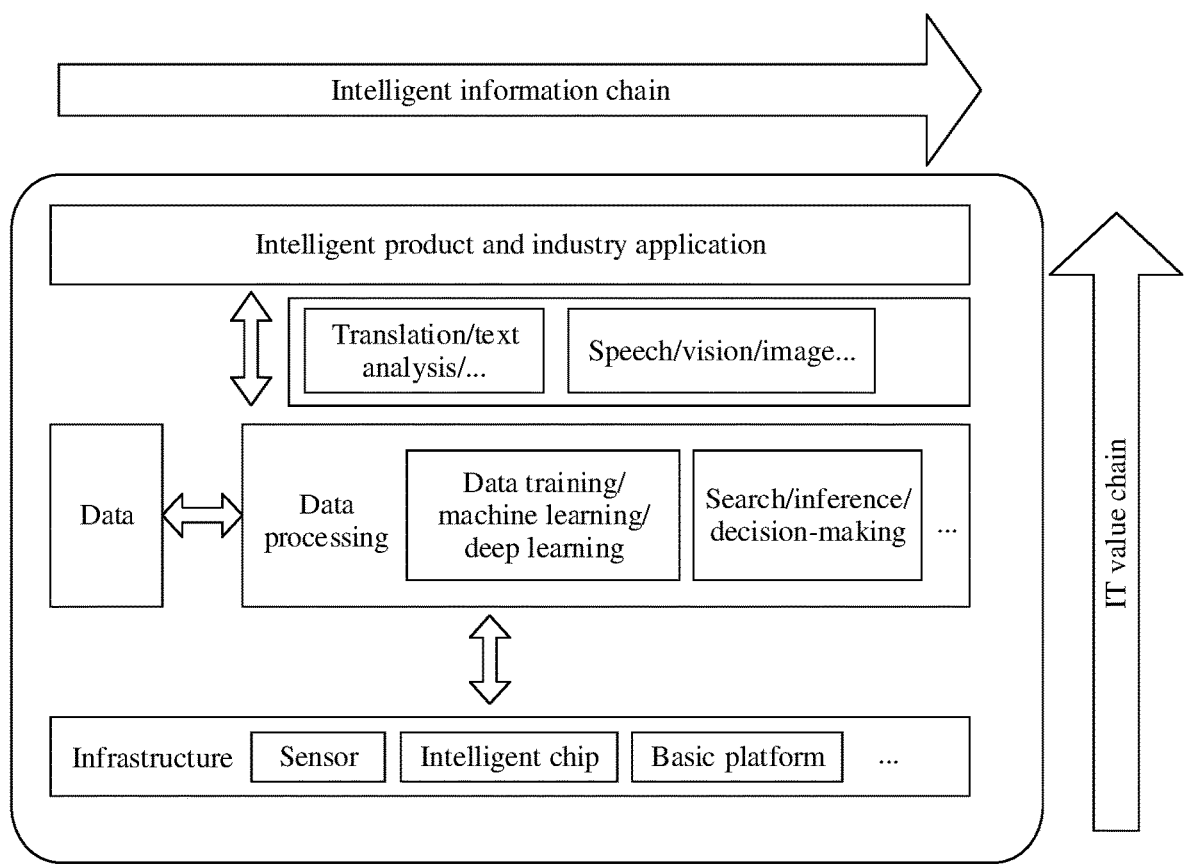
FIG. 1 is a schematic diagram of a structure of an artificial intelligence main framework.

An overall working procedure of an artificial intelligence system is first described. FIG. 1 is a schematic diagram of a structure of an artificial intelligence main framework. The following describes the artificial intelligence main framework from two dimensions: an "intelligent information chain" (a horizontal axis) and an "IT value chain" (a vertical axis). The "intelligent information chain" reflects a general process from data obtaining to data processing. For example, the process may be a general process of intelligent information perception, intelligent information representation and formation, intelligent inference, intelligent decision-making, and intelligent execution and output. In this process, data undergoes a condensation process of "data-information-knowledge-wisdom". The "IT value chain" reflects a value brought by artificial intelligence to the information technology industry from an underlying infrastructure and information (providing and processing technology implementation) of human intelligence to an industrial ecological process of a system.

(1) Infrastructure

The infrastructure provides computing capability support for the artificial intelligence system, implements communication with the external world, and implements support by using a base platform. A sensor is used to communicate with the outside. A computing capability is provided by an intelligent chip (a hardware acceleration chip such as a CPU, an NPU, a GPU, an ASIC, or an FPGA). The basic platform includes related platform assurance and support such as a distributed computing framework and a network, and may include cloud storage and computing, an interconnection and interworking network, and the like. For example, the sensor communicates with the outside to obtain data, and the data is provided to an intelligent chip in a distributed computing system for computation, where the distributed computing system is provided by the base platform.

(2) Data

Data at an upper layer of the infrastructure is used to indicate a data source in the field of artificial intelligence. The data relates to a graph, an image, a voice, and text, further relates to Internet of things data of a conventional device and includes service data of an existing system and perception data such as force, displacement, a liquid level, a temperature, and humidity.

(3) Data Processing

Data processing usually includes manners such as data training, machine learning, deep learning, search, inference, and decision-making.

Machine learning and deep learning may mean performing symbolic and formalized intelligent information modeling, extraction, preprocessing, training, and the like on data.

Inference is a process in which a human intelligent inference manner is simulated in a computer or an intelligent system, and machine thinking and problem resolving are performed by using formal information according to an inference control policy. A typical function of inference is search and matching.

Decision-making is a process in which a decision is made after intelligent information is inferred, and usually provides functions such as classification, ranking, and prediction.

(4) General Capabilities

After data processing mentioned above is performed on data, some general capabilities may be further formed based on a data processing result, for example, an algorithm or a general system, to perform translation, text analysis, computer vision processing, speech recognition, image recognition, and the like.

(5) Intelligent Product and Industry Application

Intelligent products and industry applications refer to products and applications of the artificial intelligence system in various fields and are encapsulation for an overall solution of artificial intelligence, to productize intelligent information decision-making and implement applications. Application fields thereof include an intelligent terminal, intelligent transportation, intelligent healthcare, autonomous driving, a safe city, and the like.

The embodiments may be applied to a field such as the safe city in the artificial intelligence field. The following describes an application scenario.

A video surveillance product is becoming increasingly intelligent as construction of the safe city becomes increasingly urgent. The intelligent video analysis technology uses a computer to automatically analyze video content and mine valuable information from massive videos. In the past, it took people dozens of hours to watch surveillance videos. Thanks to an intelligent video analysis system, a result can be returned within several seconds. This greatly improves work efficiency.

In the intelligent video analysis system, a pedestrian re-identification technology may associate people with a same appearance under different cameras, to infer a track of the pedestrian. The track is a spatio-temporal route that specifies an order of times and places. Input of the intelligent video analysis system is a query image that includes the pedestrian, or another specified query condition. The system searches massive image libraries or video libraries for all video clips that include the pedestrian or meet the query condition, and then infers the track of the pedestrian based on time and location information corresponding to a search result.

Figure 2:
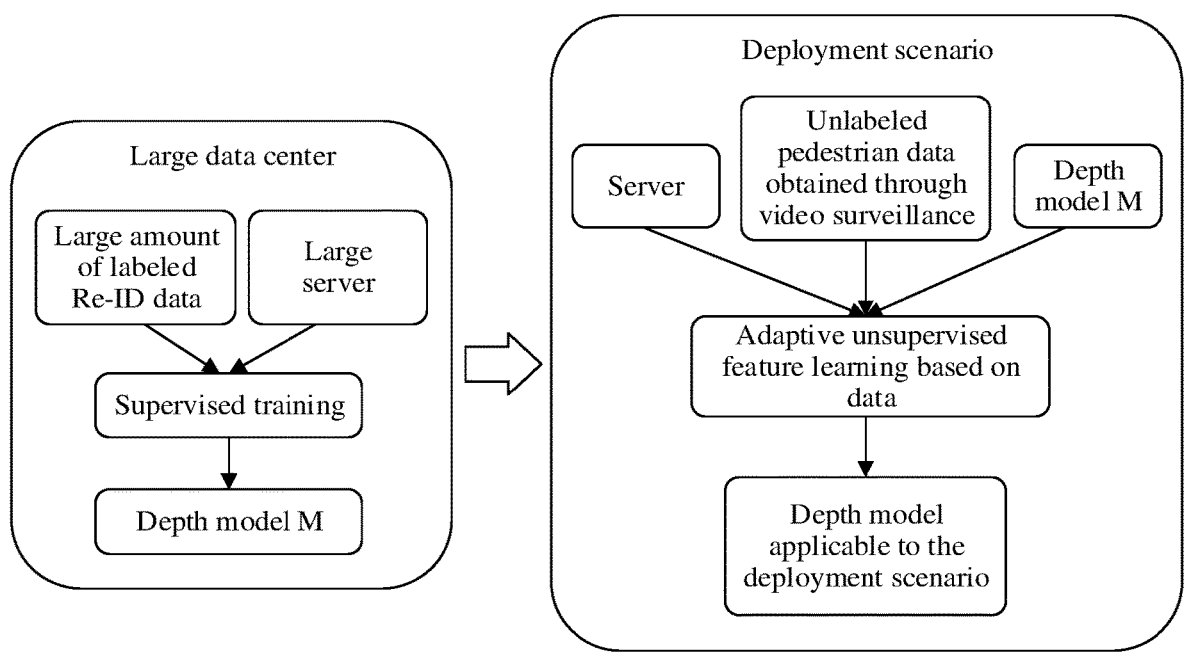
FIG. 2 is a schematic diagram of an architecture of an application scenario.

FIG. 2 is a schematic diagram of an application architecture according to an embodiment. As shown in FIG. 2, in a large data center, a large amount of labeled pedestrian re-identification (Re-ID) data may be used for training on a large server, to obtain a depth model M. The depth model M may extract image features of images and may determine an image similarity based on the extracted image features. When the depth model M is deployed on a terminal side and is used in a scenario, a large amount of unlabeled pedestrian data may be obtained by using a camera network, and adaptive training may be performed on the depth model M on the server by using the unlabeled data, to obtain a depth model applicable to a deployment scenario. In addition, for a same scenario, when data changes, for example, a season changes, adaptive training may be performed on the model by using the foregoing method to update the model, to obtain a depth model applicable to the deployment scenario.

Because the embodiments may relate to massive application of a neural network, for ease of understanding, the following describes terms and concepts related to the neural network that may be used in the embodiments.

(1) Neural Network

The neural network may include a neuron. The neuron may be an operation unit that uses $x_s$ and an intercept of 1 as input. Output of the operation unit may be as follows:

$$h_{W,b}(x)=f(W^T x)=f(\Sigma_{s=1}^n W_s x_s + b); \text{ where}$$

s=1, 2, . . . , n, n is a natural number greater than 1, $W_s$ is a weight of $x_s$, and b is an offset of the neuron. f indicates an activation function (activation function) of the neuron, where the activation function is used for introducing a non-linear characteristic into the neural network, to convert an input signal in the neuron into an output signal. The output signal of the activation function may be used as input to a next convolutional layer, and the activation function may be a sigmoid function. The neural network is a network constituted by connecting a plurality of single neurons together. Output of a neuron may be input to another neuron. Input of each neuron may be connected to a local receptive field of a previous layer to extract a feature of the local receptive field. The local receptive field may be a region including several neurons.

(2) Deep Neural Network

The deep neural network (DNN) is also referred to as a multi-layer neural network and may be understood as a neural network having a plurality of hidden layers. The DNN is divided based on positions of different layers. Neural networks inside the DNN may be classified into three types: an input layer, a hidden layer, and an output layer. Generally, the first layer is the input layer, the last layer is the output layer, and the middle layer is the hidden layer. Layers are fully connected. Any neuron at an $i^{th}$ layer is necessarily connected to any neuron at an $(i+1)^{th}$ layer.

Although the DNN seems complex, the DNN is actually not complex in terms of work at each layer and is simply represented as the following linear relationship expression: $\vec{y} = \alpha(W \cdot \vec{x} + \vec{b})$, where $\vec{x}$ is an input vector, $\vec{y}$ is an output vector, $\vec{b}$ is an offset vector, W is a weight matrix (also referred to as a coefficient), and a( ) is an activation function. At each layer, the output vector $\vec{y}$ is obtained by performing such a simple operation on the input vector $\vec{x}$. Because there is a large quantity of DNN layers, there are also a large quantity of coefficients W and offset vectors $\vec{b}$. Definitions of these parameters in the DNN are as follows: The coefficient W is used as an example. It is assumed that in a DNN having three layers, a linear coefficient from a fourth neuron at a second layer to a second neuron at a third layer is defined as $W_{23}^3$. The superscript 3 indicates a layer at which the coefficient W is located, and the subscript corresponds to an output third-layer index 2 and an input second-layer index 4.

In conclusion, a coefficient from a $k^{th}$ neuron at a $(L-1)^h$ layer to a $j^{th}$ neuron at a $L^{th}$ layer is defined as $w_{jk}^L$.

It should be noted that there is no parameter W at the input layer. In the deep neural network, more hidden layers make the network more capable of describing a complex case in the real world. Theoretically, a model with more parameters has higher complexity and a larger "capacity". It means that the model can complete a more complex learning task. Training the deep neural network is a process of learning a weight matrix, and a final objective of the training is to obtain a weight matrix of all layers of a trained deep neural network (a weight matrix formed by vectors W at a plurality of layers).

(3) Convolutional Neural Network

The convolutional neural network (CNN) is a deep neural network with a convolutional structure. The convolutional neural network includes a feature extractor including a convolution layer and a sub-sampling layer, and the feature extractor may be considered as a filter. The convolutional layer is a neuron layer that is in the convolutional neural network and at which convolution processing is performed on an input signal. At the convolutional layer of the convolutional neural network, one neuron may be connected to only a part of neurons at a neighboring layer. A convolutional layer usually includes several feature planes, and each feature plane may include some neurons arranged in a rectangle. Neurons of a same feature plane share a weight, and the shared weight herein is a convolution kernel. Sharing a weight may be understood as that a manner of extracting image information is unrelated to a location. The convolution kernel may be initialized in a form of a matrix of a random size. In a training process of the convolutional neural network, an appropriate weight may be obtained for the convolution kernel through learning. In addition, sharing the weight has advantages that connections between layers of the convolutional neural network are reduced, and a risk of overfitting is reduced.

(4) Loss Function

In a process of training the deep neural network, because it is expected that output of the deep neural network is as much as possible close to a predicted value that is actually expected, a predicted value of a current network and a target value that is actually expected may be compared, and then a weight vector of each layer of the neural network is updated based on a difference between the predicted value and the target value (further, there is usually an initialization process before the first update, parameters are preconfigured for all layers of the deep neural network). For example, if the predicted value of the network is large, the weight vector is adjusted to decrease the predicted value, and adjustment is continuously performed until the deep neural network can predict the target value that is actually expected or a value that is very close to the target value that is actually expected. Therefore, "how to compare a difference between the predicted value and the target value" needs to be predefined. This is a loss function or an objective function. The loss function and the objective function are important equations that measure the difference between the predicted value and the target value. The loss function is used as an example. A higher output value (loss) of the loss function indicates a larger difference. Therefore, training of the deep neural network is a process of minimizing the loss as much as possible.

(5) Back Propagation Algorithm

In a training process, a neural network may correct values of parameters in an initial neural network model by using an error back propagation (BP) algorithm, so that a reconstruction error loss of the neural network model becomes increasingly smaller. An input signal may be forward transferred until an error loss occurs during output, and the parameters in the initial neural network model are updated based on back propagation error loss information, so that the error loss is reduced. The back propagation algorithm is a back propagation motion dependent on the error loss and is used for obtaining parameters of an optimal neural network model, for example, a weight matrix.

Figure 3:
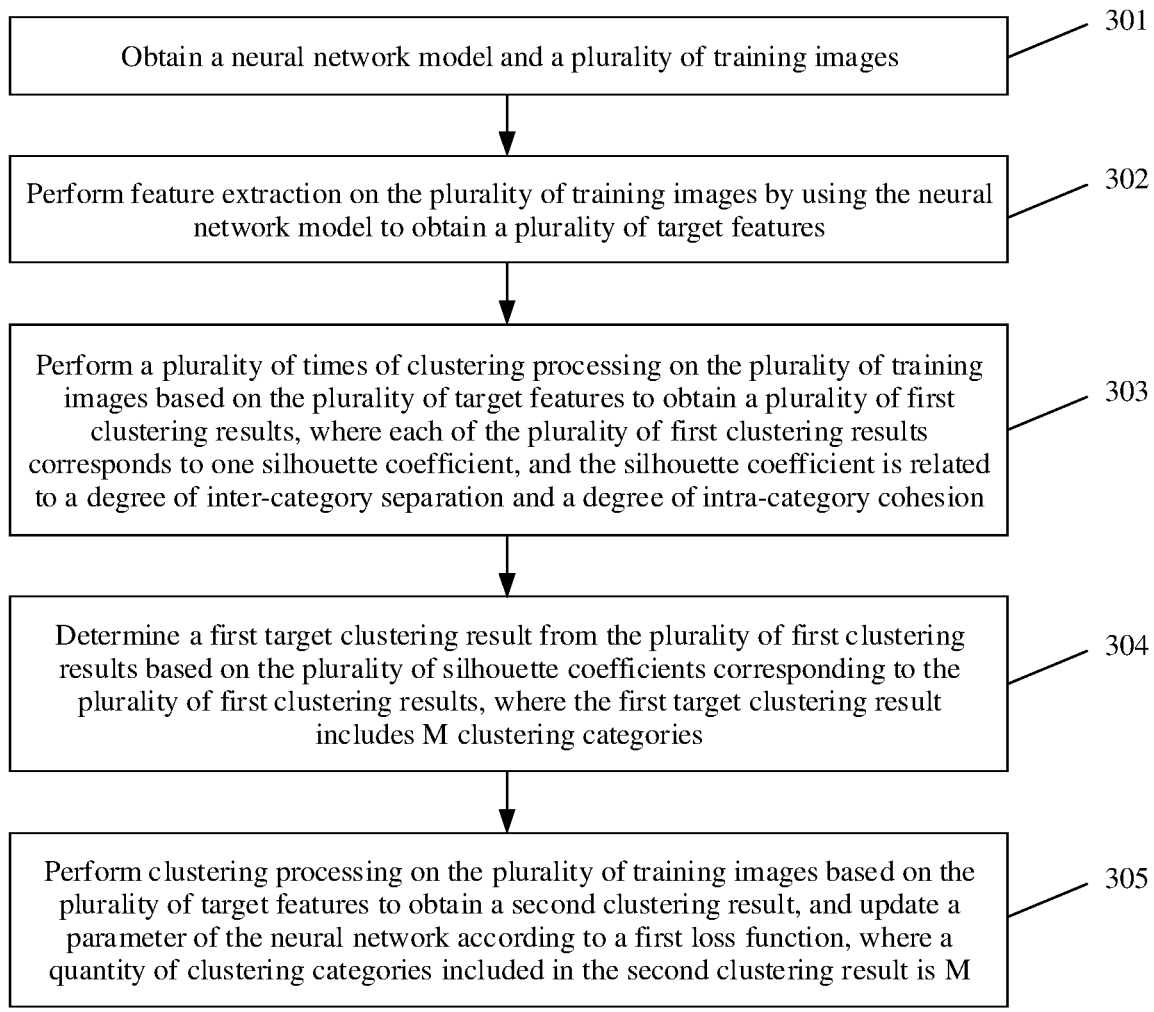
FIG. 3 is a schematic diagram of an embodiment of a model update method according to an embodiment.

FIG. 3 is a schematic diagram of an embodiment of a model update method according to an embodiment. As shown in FIG. 3, the model update method provided in this embodiment may include the following steps.

301: Obtain a neural network model and a plurality of training images.

In this embodiment, a server may obtain the neural network model and the plurality of training images. The neural network model may be a deep model obtained by a cloud side device through training on a large server based on a large amount of labeled Re-ID data.

In this embodiment, the server may obtain the plurality of training images, and the plurality of training images may be a large quantity of unlabeled pedestrian images obtained by using a camera network.

302: Perform feature extraction on the plurality of training images by using the neural network model to obtain a plurality of target features.

Figure 4:
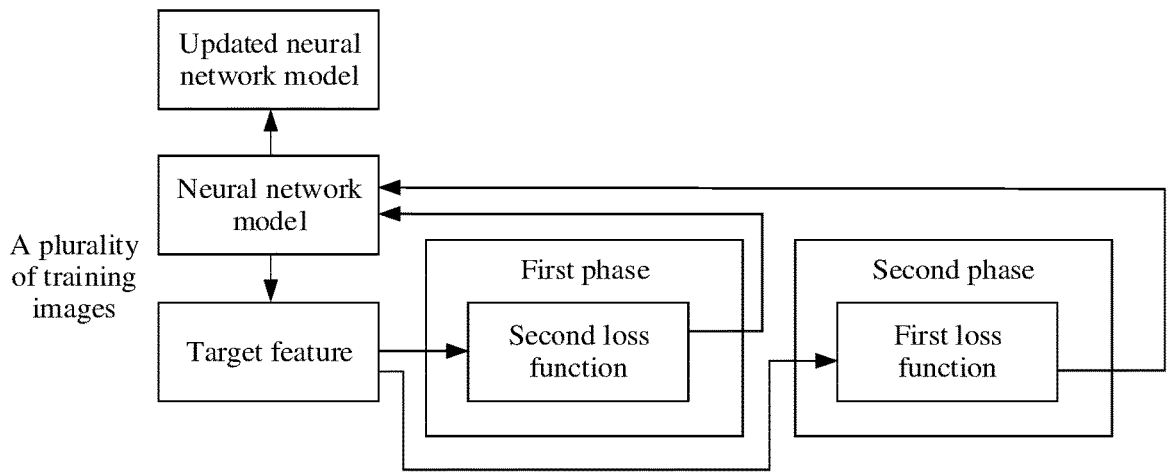
FIG. 4 is a schematic flowchart of a model update method according to an embodiment.

In this embodiment, after obtaining the neural network model and the plurality of training images, the server may perform feature extraction on the plurality of training images by using the neural network model to obtain the plurality of target features. FIG. 4 is a schematic flowchart of a model update method according to an embodiment. As shown in FIG. 4, after obtaining the neural network model and the plurality of training images, the server may perform feature extraction on the plurality of training images by using the neural network model to obtain the plurality of target features.

303: Perform a plurality of times of first clustering processing on the plurality of training images based on the plurality of target features to obtain a plurality of first clustering results, where each of the plurality of first clustering results corresponds to one silhouette coefficient, and the silhouette coefficient indicates clustering quality.

In this embodiment, the silhouette coefficient is related to a degree of inter-category separation and a degree of intra-category cohesion. The degree of inter-category separation indicates a distance between different clustering categories. The degree of intra-category cohesion indicates a distance between different training images corresponding to a same clustering category.

In this embodiment, the silhouette coefficient is positively correlated with the distance between different clustering categories, and the silhouette coefficient is negatively correlated with the distance between different training images corresponding to the same clustering category. The plurality of first clustering results may include a second target clustering result and a first target clustering result. A silhouette coefficient corresponding to the first target clustering result is greater than a silhouette coefficient corresponding to the second target clustering result.

In this embodiment, a progressive clustering manner may be used. A clustering process may be divided into two phases. In a first clustering phase, the server may perform the plurality of times of clustering processing on the plurality of training images based on the plurality of target features to obtain the plurality of first clustering results.

In the first clustering phase, the server may perform the plurality of times of first clustering processing on the plurality of training images based on the plurality of target features and update a parameter of the neural network model according to a second loss function after each time of first clustering processing.

A process of one time of clustering processing in the first clustering phase is used as an example. The server may perform one time of clustering processing on the plurality of training images based on the plurality of target features, and update the parameter of the neural network model according to the second loss function, to reduce, in a first clustering result obtained after a next time of first clustering processing, a variance of first similarity distribution between each of the plurality of training images and a plurality of clustering categories included in the first clustering result.

At the beginning of the first clustering phase, because clustering is incomplete, in an obtained first clustering result, a same target (for example, a pedestrian) may belong to different clustering categories. This impact may be reduced according to a soft multi-label learning policy. A loss function may be shown in the following formula:

$$L_{SML} = -\frac{1}{N} \sum_i \sum_j \alpha_j \log\left(\frac{\exp(W_{L(x_i)j}^T v_i)}{\sum_{k=1}^{C} \exp(W_k^T v_i)}\right), \text{ where}$$

L $(x_i)$ is a multi-label set matched by a training image i, $W_{L(x_i)j}^T$ is a weight, $v_i$ is a target feature corresponding to the training image i, and C is a quantity of clustering categories in a clustering result. In each iteration, A categories that are most similar to the training image i may be selected, and A may be a preset quantity of clustering categories. In addition, to highlight a function of categories with a high similarity, a similarity is used as a weight $a_j$. In this embodiment, as a quantity of clustering categories decreases, soft multi-label learning may gradually degrade to single-label learning as data changes.

In this embodiment, at the beginning of the first clustering phase, because clustering is incomplete, in the obtained first clustering result, a training image may belong to different clustering categories (a particular similarity exists between the training image and a plurality of clustering categories, so that the training image belongs to different clustering categories). However, in the plurality of clustering categories, the training image has a high similarity to only some of the clustering categories and has a little similarity to other clustering categories. After the neural network model is updated according to the second loss function, similarities between the training image and the some of the clustering categories gradually increase, and similarities between the training image and the other clustering categories gradually decrease. Therefore, a variance of similarity distribution between the training image and some clustering categories included in the first clustering result gradually decreases, and the clustering categories that have the high similarity to the training image gradually aggregate on the clustering categories included in the first clustering result. As the first clustering phase proceeds, soft multi-label learning can be gradually degraded to single-label learning as the data changes.

In this embodiment, after each time of clustering processing, the neural network model may be updated according to the loss function, feature extraction is performed on the training images by using an updated neural network model to obtain the plurality of target features, and a next time of clustering processing is performed on the plurality of training images based on the obtained plurality of target features.

In this embodiment, the quantity of clustering categories may gradually decrease with a quantity of iteration times based on a quantity and clustering categories with a higher similarity are preferentially clustered into one category. In this embodiment, a silhouette coefficient may be used as a clustering evaluation indicator, and an expression of the silhouette coefficient may be shown in the following formula:

$$SC = \frac{1}{N}\sum_i \frac{b_i a_i}{\max(b_i, a_i)},$$

where $b_i$ is a degree of inter-category separation, and the degree of inter-category separation indicates a distance between different clustering categories.

For example, $b_i$ may be an average value of distances from the training image i to all samples in a neighboring clustering category (a closest clustering category), and is denoted as b. The neighboring clustering category may be understood as a clustering category closest to the training image i. It should be noted that, because which clustering category is a neighboring clustering category is unknown, other clustering categories need to be screened, and a clustering category whose distance to the training image is closest to the average value is selected as the neighboring clustering category.

$a_i$ is a degree of intra-category cohesion, and the degree of intra-category cohesion indicates a distance between different training images corresponding to a same clustering category.

For example, $a_i$ may be an average distance between the training image i and other samples of a same category with the training image i.

In this embodiment, in a clustering process in the first phase, a quantity of clustering categories included in the first clustering result may be gradually reduced. After each clustering process ends, a silhouette coefficient corresponding to the first clustering result may be calculated. Finally, an optimal silhouette coefficient and a quantity M of clustering categories included in the corresponding first clustering result may be obtained.

In this embodiment, in the clustering processing process in the first phase, the plurality of times of clustering processing may include an $i^{th}$ time of clustering processing and a $j^{th}$ time of clustering processing. The $j^{th}$ time of clustering processing is after the $i^{th}$ time of clustering processing. When performing the $i^{th}$ time of clustering processing and the $j^{th}$ time of clustering processing, the server may obtain a second similarity between all of the plurality of target features. The second similarity includes image feature similarities and spatio-temporal constraint weights that are between each of the plurality of target features, a spatio-temporal constraint weight when the $j^{th}$ clustering processing is performed is greater than a spatio-temporal constraint weight when the $i^{th}$ clustering processing is performed, and the spatio-temporal constraint weight indicates a capability of affecting the second similarity between the target features by a spatio-temporal constraint. The $i^{th}$ time of clustering processing and the $j^{th}$ time of clustering processing are performed on the plurality of training images based on the second similarity, where i and j are positive integers.

In this embodiment, in first several times of the plurality of times of clustering processing, a spatio-temporal constraint may have great impact on a similarity between training images. For example, a plurality of training images are training images shot by a camera 1, a plurality of training images are training images shot by a camera 2 and shooting areas of the camera 1 and the camera 2 overlap greatly. Therefore, there is a spatio-temporal constraint between the training images shot by the camera 1 and the training images shot by the camera 2. In the first several times of the plurality of times of clustering processing in the first clustering phase, because there is the spatio-temporal constraint between the training images shot by the camera 1 and the training images shot by the camera 2, objects that may be clustered are, to a large extent, the training images shot by the camera 1 and the camera 2.

In this embodiment, the spatio-temporal constraint may be understood as a spatio-temporal transfer probability.

In this embodiment, an adaptive adjustment process of the spatio-temporal constraint is added. A degree of the spatio-temporal constraint is adjusted based on a clustering status of each first clustering result, and the spatio-temporal constraint is reduced in the first several times of the plurality of times of clustering processing. For example, the plurality of times of clustering processing may include the $i^{th}$ time of clustering processing and the $j^{th}$ time of clustering processing, and the $j^{th}$ time of clustering processing is after the $i^{th}$ time of clustering processing. When the $i^{th}$ time of clustering processing and the $j^{th}$ time of clustering processing are performed, the second similarity between all of the plurality of target features is obtained. The second similarity includes the image feature similarities and the spatio-temporal constraint weights between all of the plurality of target features, the spatio-temporal constraint weight when the $j^{th}$ clustering processing is performed is greater than the spatio-temporal constraint weight when the $i^{th}$ clustering processing is performed, and the spatio-temporal constraint weight indicates the capability of affecting the second similarity between the target features by a spatio-temporal constraint. The $i^{th}$ time of clustering processing and the $j^{th}$ time of clustering processing are performed on the plurality of training images based on the second similarity.

In this embodiment, the server may obtain the second similarity between all of the plurality of target features. The second similarity includes the image feature similarities and the spatio-temporal constraint weights between all of the plurality of target features. The plurality of times of clustering processing are performed on the plurality of training images based on the second similarity, and the spatio-temporal constraint weights between all of the plurality of target features are updated based on the corresponding first clustering result after each time of clustering processing.

The degree of the spatio-temporal constraint in the clustering process in the first phase may be updated according to the following formula:

$$s(x_i,x_j)=s_v(x_i,x_j)*(1-\alpha_i*(P_{ST}(x_i,x_j)-1)), \text{ where}$$

$s_v(x_i,x_j)$ is a similarity based image features, $P_{ST}(x_i,x_j)$ is a spatio-temporal transfer probability of an image, $\alpha_i$ is a constraint degree obtained based on a clustering status, and $s(x_i,x_j)$ is used as a final similarity for clustering.

304: Determine a first target clustering result from the plurality of first clustering results based on a plurality of silhouette coefficients corresponding to the plurality of first clustering results, where the first target clustering result includes M clustering categories.

In this embodiment, in the clustering process in the first phase, the quantity of clustering categories included in the first clustering result may be gradually reduced. After each clustering process ends, the silhouette coefficients corresponding to the first clustering result may be calculated. Finally, the optimal silhouette coefficient and the quantity M of clustering categories included in the corresponding first clustering result may be obtained.

In this embodiment, the silhouette coefficient is positively correlated with the distance between different clustering categories, and the silhouette coefficient is negatively correlated with the distance between different training images corresponding to the same clustering category. The plurality of first clustering results may include the second target clustering result and the first target clustering result. The silhouette coefficient corresponding to the first target clustering result is greater than the silhouette coefficient corresponding to the second target clustering result. In other words, in this embodiment, the largest silhouette coefficient may be selected as the optimal silhouette coefficient, and a quantity M of clustering categories included in a first clustering result corresponding to the largest silhouette coefficient is determined.

305: Perform second clustering processing on the plurality of training images based on the plurality of target features to obtain a second clustering result, and update the parameter of the neural network model according to a first loss function, where a quantity of clustering categories included in the second clustering result is M.

In this embodiment, after the first target clustering result is determined from the plurality of first clustering results based on the plurality of silhouette coefficients corresponding to the plurality of first clustering results, where the first target clustering result includes the M clustering categories, second clustering processing may be performed on the plurality of training images based on the plurality of target features to obtain the second clustering result, and the parameter of the neural network model is updated according to the first loss function. The quantity of clustering categories included in the second clustering result is M.

In a clustering process in a second phase, feature extraction may be performed on the plurality of training images based on a neural network model that is obtained through update after a last time of clustering processing in the clustering process in the first phase, to obtain a plurality of target features. Clustering processing is performed on the plurality of training images based on the plurality of target features to obtain the second clustering result. The parameter of the neural network model is updated according to the first loss function, and the quantity of clustering categories included in the second clustering result is M. That is, in the clustering process in the second phase, a quantity of clustering categories included in a second clustering result obtained each time is the quantity M of clustering categories included in the first clustering result corresponding to the optimal silhouette coefficient determined in the clustering process in the first phase.

In the conventional technology, in a process in which a pair of unlabeled samples in a target scenario is used for training, each sample is considered as an independent clustering category at the beginning, and a quantity of clustering categories is reduced in each iteration according to a minimum distance principle. As iteration is performed, the quantity of clustering categories decreases, and model training performance is gradually improved. Finally, models corresponding to different quantities of clustering categories are verified, to determine a model with optimal performance In the foregoing verification process, the models corresponding to different quantities of clustering categories obtained need to be verified based on labeled samples. However, in some scenarios, the labeled samples are difficult to obtain. Compared with the conventional technology, in this embodiment, an optimal quantity of clusters categories does not need to be determined by verifying, based on the labeled samples, the obtained models corresponding to different quantities of clustering categories.

In this embodiment, the first loss function includes a triplet loss function.

In this embodiment, the server may update the parameter of the neural network model according to the triplet loss function and the second loss function, to reduce in a second clustering result obtained after a next time of clustering processing, a variance of first similarity distribution between each of the plurality of training images and a plurality of clustering categories included in the second clustering result, and a distance between different clustering categories in the second clustering result obtained after the next time of clustering processing.

In this embodiment, the server may update the neural network model according to the triplet loss function, to further enhance a feature determining capability. The triplet loss function is as follows:

$$L_{triplet} = \frac{1}{N}\sum_i \max(\|v_a^i - v_p^i\|_2 - \|v_a^i - v_n^i\|_2 + \text{margin}, 0),$$

where indicates the target feature of the training image i, $v_p^i$ indicates a target feature of a training image of a same type as the training image i, and $v_a^i$ indicates a target feature of a training image of a different type from the training image i. A final objective of the triplet loss function is to make a distance between training images of different types greater than a distance between training images of a same type, to improve the feature determining capability of the neural network model. For descriptions of the second loss function, refer to the descriptions in the foregoing embodiment. Details are not described herein again.

This embodiment may provide the model update method. The method includes: obtaining the neural network model and the plurality of training images; performing feature extraction on the plurality of training images by using the neural network model to obtain the plurality of target features; performing the plurality of times of first clustering processing on the plurality of training images based on the plurality of target features to obtain the plurality of first clustering results, where each of the plurality of first clustering results corresponds to one silhouette coefficient, and the silhouette coefficient indicates clustering quality; determining the first target clustering result from the plurality of first clustering results based on a plurality of silhouette coefficient corresponding to the plurality of first clustering results, where the first target clustering result includes the M clustering categories; and performing second clustering processing on the plurality of training images based on the plurality of target features to obtain the second clustering result, and updating the parameter of the neural network model according to the first loss function, where the quantity of clustering categories included in the second clustering result is M. In the foregoing manner, the optimal quantity of clusters categories does not need to be determined by verifying, based on the labeled samples, the models corresponding to different obtained quantities of clustering categories, and the optimal quantity of clustering categories may be directly selected based on the first clustering result.

The following describes a system architecture provided in an embodiment.

Figure 5:
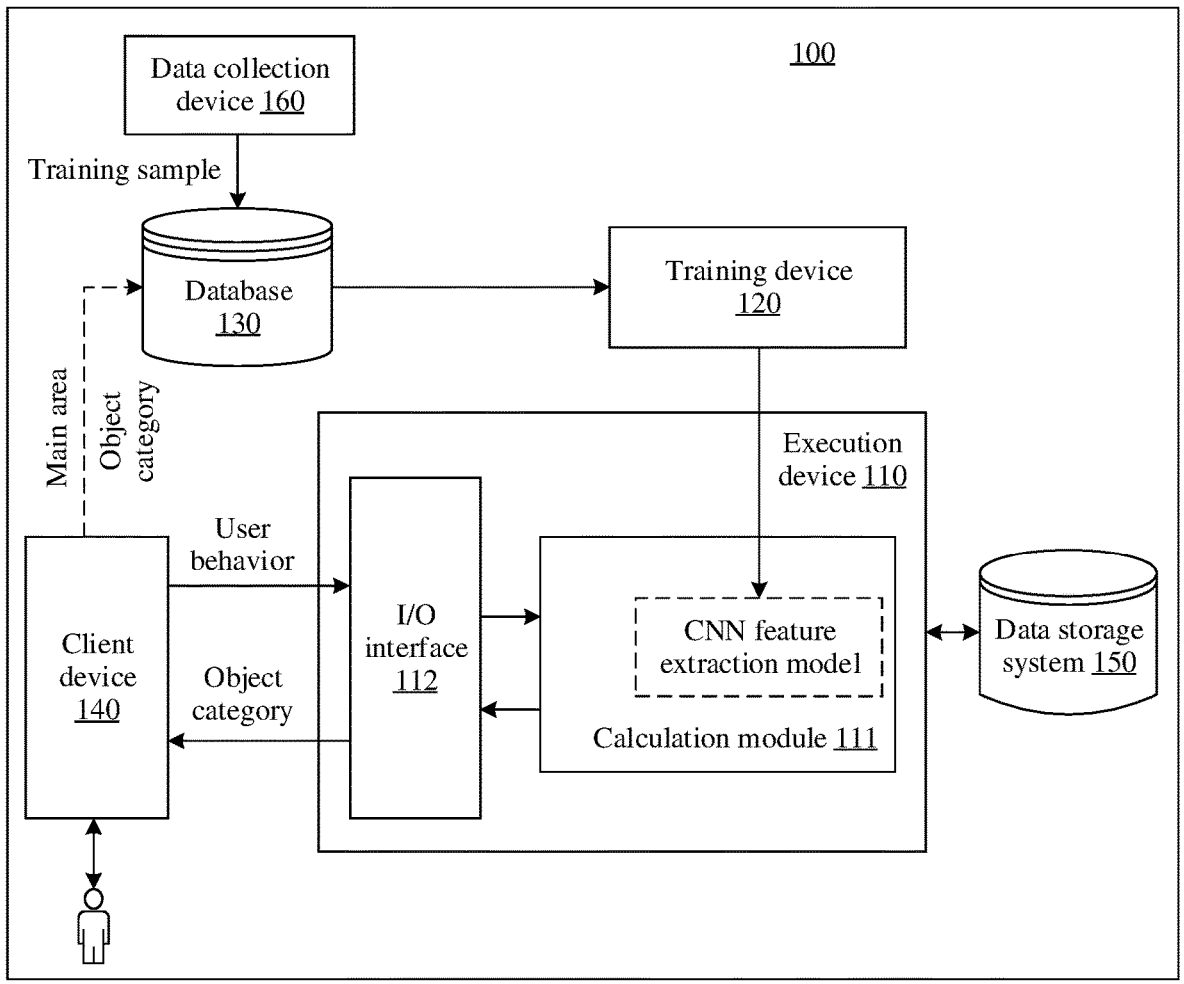
FIG. 5 is a schematic diagram of a system architecture according to an embodiment.

As shown in FIG. 5, an embodiment may provide a system architecture 100. As shown in the system architecture 100, a data collection device 160 is configured to: collect training data, where the training data in this embodiment includes a plurality of training images and a neural network model; and store the training data in a database 130. A training device 120 trains and updates the neural network model based on the training data maintained in the database 130. It should be noted that, during an actual application, the training data maintained in the database 130 is not necessarily all collected by the data collection device 160 and may be received from another device. In addition, it should be noted that the training device 120 does not necessarily train the neural network model completely based on the training data maintained in the database 130 and may obtain training data from a cloud or another place for model training. The foregoing description should not be construed as a limitation on this embodiment.

A target model/rule obtained through training by the training device 120 may be applied to different systems or devices, for example, an execution device 110 shown in FIG. 5. The execution device 110 may be a terminal, for example, a mobile phone terminal, a tablet computer, a laptop computer, augmented reality (AR)/virtual reality (VR), or a vehicle-mounted terminal; or may be a server, a cloud, or the like. In FIG. 5, an input/output (I/O) interface 112 is configured for the execution device 110 and is configured to exchange data with an external device. A user may input data to the I/O interface 112 by using a client device 140. The input data may include the plurality of training images and the neural network model in this embodiment.

In a process in which the execution device 110 preprocesses the input data, or in a process in which a calculation module 111 of the execution device 110 performs related processing such as calculation (for example, implements a function of the neural network), the execution device 110 may invoke data, code, and the like in a data storage system 150 for corresponding processing; or may store data, instructions, and the like obtained through corresponding processing into the data storage system 150.

Finally, the I/O interface 112 returns a processing result to the client device 140, to provide the processing result for the user.

It should be noted that the training device 120 may generate corresponding target models/rules for different targets or different tasks based on different training data. The corresponding target models/rules may be used to implement the targets or complete the tasks, to provide a required result for the user.

In a case shown in FIG. 5, the user may manually provide the input data. Manually providing may be performed through an interface provided by the I/O interface 112. In another case, the client device 140 may automatically send the input data to the I/O interface 112. If it is required that the client device 140 needs to obtain authorization from the user to automatically send the input data, the user may set corresponding permission on the client device 140. The user may check, on the client device 140, the result output by the execution device 110. The result may be presented in a form of display, sound, an action, or the like. The client device 140 may also serve as a data collector to collect, as new sample data, the input data that is input to the I/O interface 112 and an output result that is output from the I/O interface 112 shown in the figure and store the new sample data in the database 130. Also, the client device 140 may alternatively not perform collection. Instead, the I/O interface 112 directly stores, as new sample data, the input data that is input to the I/O interface 112 and the output result that is output from the I/O interface 112 in the figure in the database 130.

It should be noted that FIG. 5 is merely a schematic diagram of a system architecture according to an embodiment. A location relationship between the devices, the components, the modules, and the like shown in the figure does not constitute any limitation. For example, in FIG. 5, the data storage system 150 is an external memory relative to the execution device 110, but in another case, the data storage system 150 may alternatively be disposed in the execution device 110.

Figure 6:
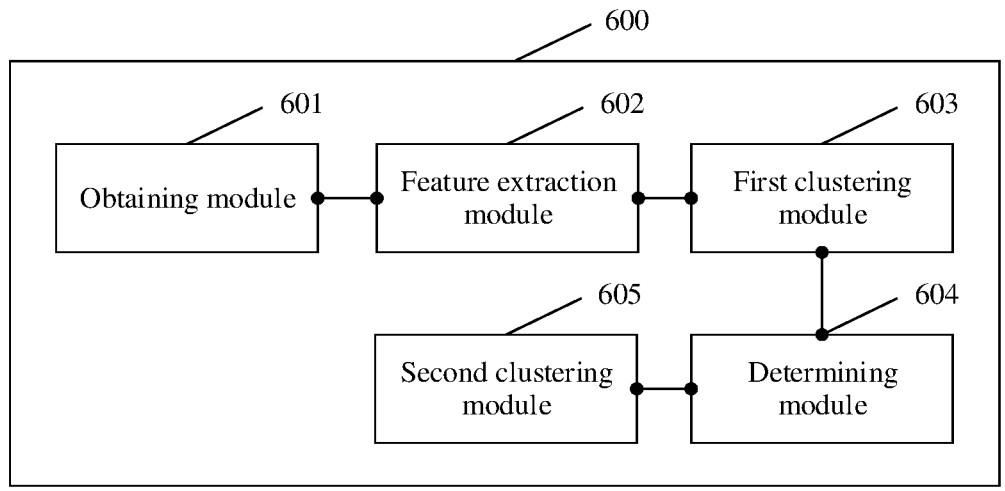
FIG. 6 is a schematic diagram of a structure of a model update apparatus according to an embodiment.

Based on the embodiments corresponding to FIG. 1 to FIG. 5, to better implement the foregoing solutions in embodiments, the following further provides a related device configured to implement the foregoing solutions. FIG. 6 may be a schematic diagram of a structure of a model update apparatus 600 according to an embodiment. The model update apparatus 600 may be a terminal device or a server. The model update apparatus 600 includes:

an obtaining module 601, configured to obtain a neural network model and a plurality of training images;

a feature extraction module 602, configured to perform feature extraction on the plurality of training images by using the neural network model to obtain a plurality of target features;

a first clustering module 603, configured to perform a plurality of times of first clustering processing on the plurality of training images based on the plurality of target features to obtain a plurality of first clustering results, where each of the plurality of first clustering results corresponds to one silhouette coefficient, and the silhouette coefficient indicates clustering quality;

a determining module 604, configured to determine a first target clustering result from the plurality of first clustering results based on a plurality of silhouette coefficients corresponding to the plurality of first clustering results, where the first target clustering result includes M clustering categories; and a second clustering module 605, configured to perform second clustering processing on the plurality of training images based on the plurality of target features to obtain a second clustering result, and update a parameter of the neural network model according to a first loss function, where a quantity of clustering categories included in the second clustering result is M.

Optionally, the silhouette coefficient is calculated based on a degree of inter-category separation and a degree of intra-category cohesion. The degree of inter-category separation indicates a distance between different clustering categories. The degree of intra-category cohesion indicates a distance between different training images corresponding to a same clustering category.

Optionally, a silhouette coefficient corresponding to the first target clustering result is greater than a silhouette coefficient corresponding to a clustering result other than the first target clustering result in the plurality of first clustering results.

Optionally, the first clustering module is configured to:
perform the plurality of times of first clustering processing on the plurality of training images based on the plurality of target features and update the parameter of the neural network model according to a second loss function after each time of first clustering processing.

Optionally, the first clustering module is configured to:
update the parameter of the neural network model according to the second loss function after each time of first clustering processing, to reduce, in a first clustering result obtained after a next time of first clustering processing, a variance of first similarity distribution between each of the plurality of training images and a plurality of clustering categories included in the first clustering result.

Optionally, the plurality of times of first clustering processing may include an $i^{th}$ time of clustering processing and a $j^{th}$ time of clustering processing, and the $j^{th}$ time of clustering processing is after the $i^{th}$ time of clustering processing. The first clustering module is configured to:

obtain a second similarity between all of the plurality of target features when the $i^{th}$ time of clustering processing and the $j^{th}$ time of clustering processing are performed, where the second similarity includes image feature similarities and spatio-temporal constraint weights that are between each of the plurality of target features, a spatio-temporal constraint weight when the $j^{th}$ clustering processing is performed is greater than a spatio-temporal constraint weight when the $i^{th}$ clustering processing is performed, and a spatio-temporal constraint weight indicates a capability of affecting the second similarity between the target features by a spatio-temporal constraint; and perform the $i^{th}$ time of clustering processing and the $j^{th}$ time of clustering processing on the plurality of training images based on the second similarity, where i and j are positive integers.

Optionally, the first clustering module is configured to:

obtain the second similarity between all of the plurality of target features when the $i^{th}$ time of clustering processing and the $j^{th}$ time of clustering processing are performed, where the second similarity includes the image feature similarities and the spatio-temporal constraint weights that are between each of the plurality of target features; and perform the plurality of times of first clustering processing on the plurality of training images based on the second similarity and update the spatio-temporal constraint weights between all of the plurality of target features based on a corresponding first clustering result after each time of first clustering processing.

Optionally, the second loss function includes a triplet loss function.

Optionally, the second clustering module is configured to:

update the parameter of the neural network model according to the triplet loss function and the second loss function, to reduce, in a second clustering result obtained after a next time of second clustering processing, a variance of first similarity distribution between each of the plurality of training images and a plurality of clustering categories included in the second clustering result, and increase a distance between different clustering categories in the second clustering result obtained after the next time of clustering processing.

This embodiment may provide the model update apparatus. The obtaining module 601 obtains the neural network model and the plurality of training images. The feature extraction module 602 performs feature extraction on the plurality of training images by using the neural network model to obtain the plurality of target features. The first clustering module 603 performs the plurality of times of first clustering processing on the plurality of training images based on the plurality of target features to obtain the plurality of first clustering results, where each of the plurality of first clustering results corresponds to one silhouette coefficient, and the silhouette coefficient indicates clustering quality. The determining module 604 determines the first target clustering result from the plurality of first clustering results based on a plurality of silhouette coefficients corresponding to the plurality of first clustering results, where the first target clustering result includes the M clustering categories. The second clustering module 605 performs second clustering processing on the plurality of training images based on the plurality of target features to obtain the second clustering result, and updates the parameter of the neural network model according to the first loss function, where the quantity of clustering categories included in the second clustering result is M. In the foregoing manner, an optimal quantity of clusters categories does not need to be determined by verifying, based on labeled samples, models corresponding to different obtained quantities of clustering categories, and the optimal quantity of clustering categories may be directly selected based on the first clustering result.

Figure 7:
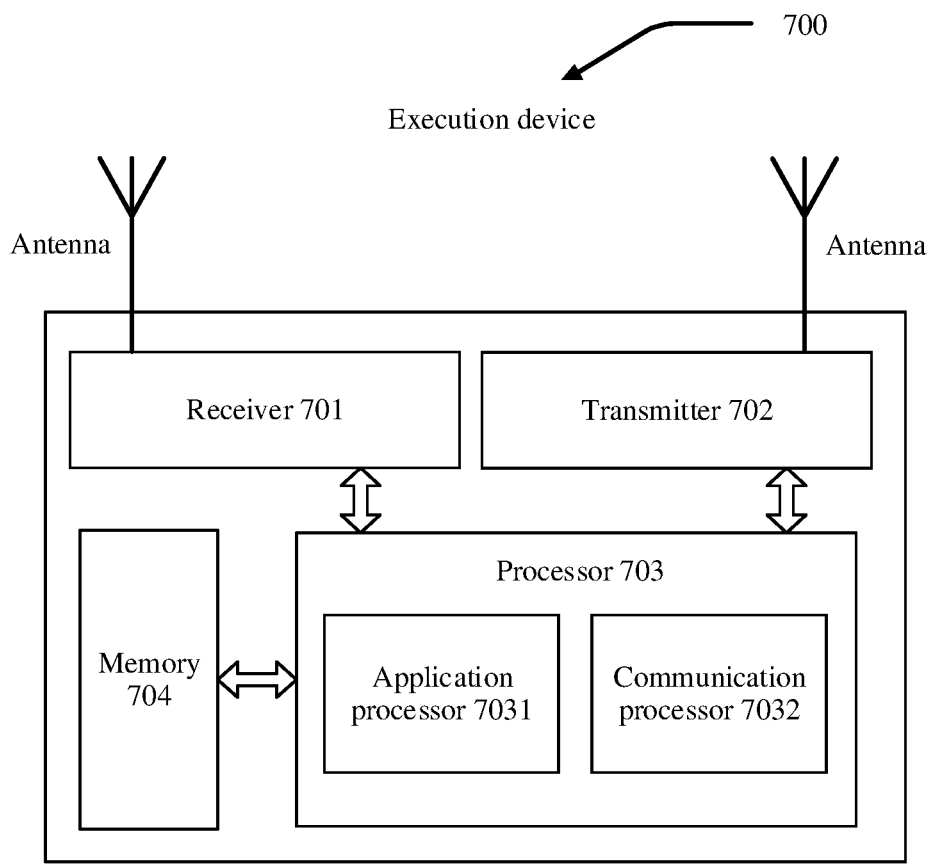
FIG. 7 is a schematic diagram of a structure of an execution device according to an embodiment.

The following describes an execution device provided in an embodiment. FIG. 7 is a schematic diagram of a structure of an execution device according to an embodiment. An execution device 700 may be presented as a virtual reality VR device, a mobile phone, a tablet, a notebook computer, an intelligent wearable device, a monitoring data processing device, or the like. This is not limited herein. The execution device 700 may include a receiver 701, a transmitter 702, a processor 703, and a memory 704 (there may be one or more processors 703 in the execution device 700, and one processor is used as an example in FIG. 7). The processor 703 may include an application processor 7031 and a communication processor 7032. In some embodiments, the receiver 701, the transmitter 702, the processor 703, and the memory 704 may be connected through a bus or in another manner.

The memory 704 may include a read-only memory and a random access memory and provide instructions and data to the processor 703. A part of the memory 704 may further include a non-volatile random access memory (NVRAM). The memory 704 stores a processor and operation instructions, an executable module or a data structure, or a subset thereof, or an extended set thereof. The operation instructions may include various operation instructions used to implement various operations.

The processor 703 controls an operation of the execution device. In an application, all components of the execution device are coupled together by using a bus system. In addition to a data bus, the bus system may include a power bus, a control bus, a status signal bus, and the like. However, for clear description, various buses in the figure are referred to as the bus system.

The method in the foregoing embodiment may be applied to the processor 703 or may be implemented by the processor 703. The processor 703 may be an integrated circuit chip and has a signal processing capability. In an implementation process, steps in the foregoing method may be implemented by using a hardware integrated logical circuit in the processor 703, or by using instructions in a form of software. The processor 703 may be a general-purpose processor, a digital signal processor (DSP), a microprocessor, or a microcontroller. The processor 703 may further include an application-specific integrated circuit (ASIC), a field-programmable gate array (FPGA) or another programmable logic device, a discrete gate, or a transistor logic device, or a discrete hardware component. The processor 703 may implement or perform the method, the steps, and the logical block diagrams in embodiments. The general-purpose processor may be a microprocessor, or the processor may be any conventional processor or the like. Steps of the method embodiments may be directly executed and accomplished by using a hardware decoding processor or may be executed and accomplished by using a combination of hardware and software modules in a decoding processor. The software module may be located in a mature storage medium in the art, such as a random access memory, a flash memory, a read-only memory, a programmable read-only memory, an electrically erasable programmable memory, or a register.

The storage medium is located in the memory 704, and the processor 703 reads information in the memory 704 and completes the steps in the foregoing method in combination with hardware of the processor 703.

The receiver 701 may be configured to receive input digit or character information and generate signal input related to related setting and function control of the execution device. The transmitter 702 may be configured to output digital or character information through a first interface. The transmitter 702 may be further configured to send instructions to a disk group through the first interface, to modify data in the disk group. The transmitter 702 may further include a display device such as a display screen.

In this embodiment, in one case, the processor 703 is configured to perform the model update method performed by the execution device in the embodiment corresponding to FIG. 3. The application processor 7031 may process image data based on the updated neural network model obtained in FIG. 3.

Figure 8:
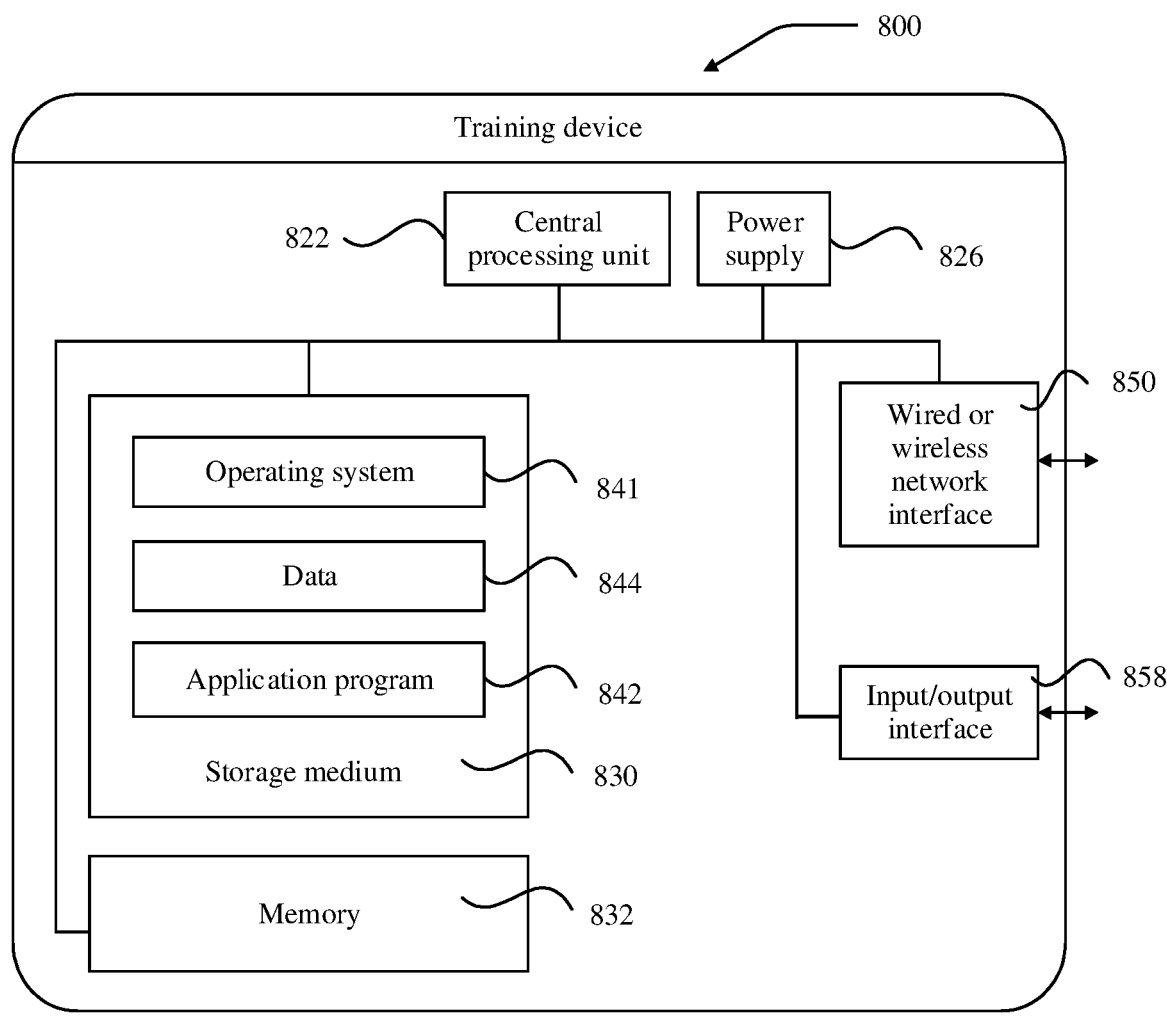
FIG. 8 is a schematic diagram of a structure of a training device according to an embodiment.

An embodiment may further provide a training device. FIG. 8 is a schematic diagram of a structure of the training device according to an embodiment. The model update apparatus described in the embodiment corresponding to FIG. 6 may be deployed on a training device 800, to implement a function of the model update apparatus in the embodiment corresponding to FIG. 6. The training device 800 is implemented by one or more servers, and the training device 800 may differ greatly due to different configurations or performance. The training device 800 may include one or more central processing units (CPU) 822 (for example, one or more processors) and a memory 832, and one or more storage media 830 (for example, one or more mass storage devices) that store an application program 842 or data 844. The memory 832 and the storage medium 830 may be transient storage or persistent storage. A program stored in the storage medium 830 may include at least one module (not shown in the figure), and each module may include a series of instruction operations for the training device. Further, the central processing unit 822 may be configured to: communicate with the storage medium 830, and perform, on the training device 800, the series of instruction operations in the storage medium 830.

The training device 800 may further include one or more power supplies 826, one or more wired or wireless network interfaces 850, one or more input/output interfaces 858, and/or one or more operating systems 841, such as Windows Server™, Mac OS X™, Unix™, Linux™, or FreeBSD™.

In this embodiment, the central processing unit 822 is configured to perform the model update method performed by the model update apparatus in the embodiment corresponding to FIG. 6. The central processing unit 822 may be configured to:

obtain a neural network model and a plurality of training images;

perform feature extraction on the plurality of training images by using the neural network model to obtain a plurality of target features;

perform a plurality of times of first clustering processing on the plurality of training images based on the plurality of target features to obtain a plurality of first clustering results, where each of the plurality of first clustering results corresponds to one silhouette coefficient, and the silhouette coefficient indicates clustering quality;

determine a first target clustering result from the plurality of first clustering results based on a plurality of silhouette coefficients corresponding to the plurality of first clustering results, where the first target clustering result includes M clustering categories; and perform second clustering processing on the plurality of training images based on the plurality of target features to obtain a second clustering result, and update a parameter of the neural network model according to a first loss function, where a quantity of clustering categories included in the second clustering result is M.

Optionally, the silhouette coefficient is calculated based on a degree of inter-category separation and a degree of intra-category cohesion. The degree of inter-category separation indicates a distance between different clustering categories. The degree of intra-category cohesion indicates a distance between different training images corresponding to a same clustering category.

Optionally, a silhouette coefficient corresponding to the first target clustering result is greater than a silhouette coefficient corresponding to a clustering result other than the first target clustering result in the plurality of first clustering results.

Optionally, the performing a plurality of times of first clustering processing on the plurality of training images based on the plurality of target features includes:

performing the plurality of times of first clustering processing on the plurality of training images based on the plurality of target features and updating the parameter of the neural network model according to a second loss function after each time of first clustering processing.

Optionally, the updating the parameter of the neural network model according to a second loss function after each time of first clustering processing includes:

updating the parameter of the neural network model according to the second loss function after each time of first clustering processing, to reduce, in a first clustering result obtained after a next time of first clustering processing, a variance of first similarity distribution between each of the plurality of training images and a plurality of clustering categories included in the first clustering result.

Optionally, the plurality of times of first clustering processing may include an $i^{th}$ time of clustering processing and a $j^{th}$ time of clustering processing; the $j^{th}$ time of clustering processing is after the $i^{th}$ time of clustering processing; and the performing a plurality of times of first clustering processing on the plurality of training images based on the plurality of target features includes:

obtaining a second similarity between all of the plurality of target features when the $i^{th}$ time of clustering processing and the $j^{th}$ time of clustering processing are performed, where the second similarity includes image feature similarities and spatio-temporal constraint weights that are between each of the plurality of target features, a spatio-temporal constraint weight when the $j^{th}$ clustering processing is performed is greater than a spatio-temporal constraint weight when the $i^{th}$ clustering processing is performed, and a spatio-temporal constraint weight indicates a capability of affecting the second similarity between the target features by a spatio-temporal constraint; and performing the $i^{th}$ time of clustering processing and the $j^{th}$ time of clustering processing on the plurality of training images based on the second similarity, where i and j are positive integers.

Optionally, the performing a plurality of times of first clustering processing on the plurality of training images based on the plurality of target features includes:

obtaining the second similarity between all of the plurality of target features when the $i^{th}$ time of clustering processing and the $j^{th}$ time of clustering processing are performed, where the second similarity includes the image feature similarities and the spatio-temporal constraint weights that are between each of the plurality of target features; and performing the plurality of times of first clustering processing on the plurality of training images based on the second similarity and updating the spatio-temporal constraint weights between all of the plurality of target features based on a corresponding first clustering result after each time of first clustering processing.

Optionally, the second loss function includes a triplet loss function.

Optionally, the updating a parameter of the neural network model according to a first loss function includes:

updating the parameter of the neural network model according to the triplet loss function and the second loss function, to reduce, in a second clustering result obtained after a next time of second clustering processing, a variance of first similarity distribution between each of the plurality of training images and a plurality of clustering categories included in the second clustering result, and increase a distance between different clustering categories in the second clustering result obtained after the next time of clustering processing.

This embodiment may provide the model update method. The method includes: obtaining the neural network model and the plurality of training images; performing feature extraction on the plurality of training images by using the neural network model to obtain the plurality of target features; performing the plurality of times of first clustering processing on the plurality of training images based on the plurality of target features to obtain the plurality of first clustering results, where each of the plurality of first clustering results corresponds to one silhouette coefficient, and the silhouette coefficient indicates clustering quality; determining the first target clustering result from the plurality of first clustering results based on a plurality of silhouette coefficient corresponding to the plurality of first clustering results, where the first target clustering result includes the M clustering categories; and performing second clustering processing on the plurality of training images based on the plurality of target features, to obtain the second clustering result, and updating the parameter of the neural network model according to the first loss function, where the quantity of clustering categories included in the second clustering result is M. In the foregoing manner, an optimal quantity of clusters categories does not need to be determined by verifying, based on labeled samples, models corresponding to different obtained quantities of clustering categories, and the optimal quantity of clustering categories may be directly selected based on the first clustering result.

An embodiment may further provide a computer program product. When the computer program product runs on a computer, the computer performs the steps performed by the execution device in the method described in the embodiment shown in FIG. 7, or performs the steps performed by the training device in the method described in the embodiment shown in FIG. 8.

An embodiment may further provide a non-transitory computer-readable storage medium. The non-transitory computer-readable storage medium may store a program used for signal processing. When the program runs on a computer, the computer performs the steps performed by the execution device in the method described in the embodiment shown in FIG. 7, or performs the steps performed by the training device in the method described in the embodiment shown in FIG. 8.

The execution device, the training device, or the terminal device provided in embodiments may be a chip. The chip includes a processing unit and a communication unit. The processing unit may be, for example, a processor; and the communication unit may be, for example, an input/output interface, a pin, or a circuit. The processing unit may execute computer-executable instructions stored in a storage unit, so that a chip in the execution device performs the model update method described in the embodiment shown in FIG. 3, or a chip in the training device performs the model update method described in the embodiment shown in FIG. 3. Optionally, the storage unit is a storage unit in the chip, for example, a register or a cache. Alternatively, the storage unit may be a storage unit that is in a radio access device and that is located outside the chip, for example, a read-only memory (ROM), another type of static storage device that can store static information and instructions, a random access memory (RAM), or the like.

Figure 9:
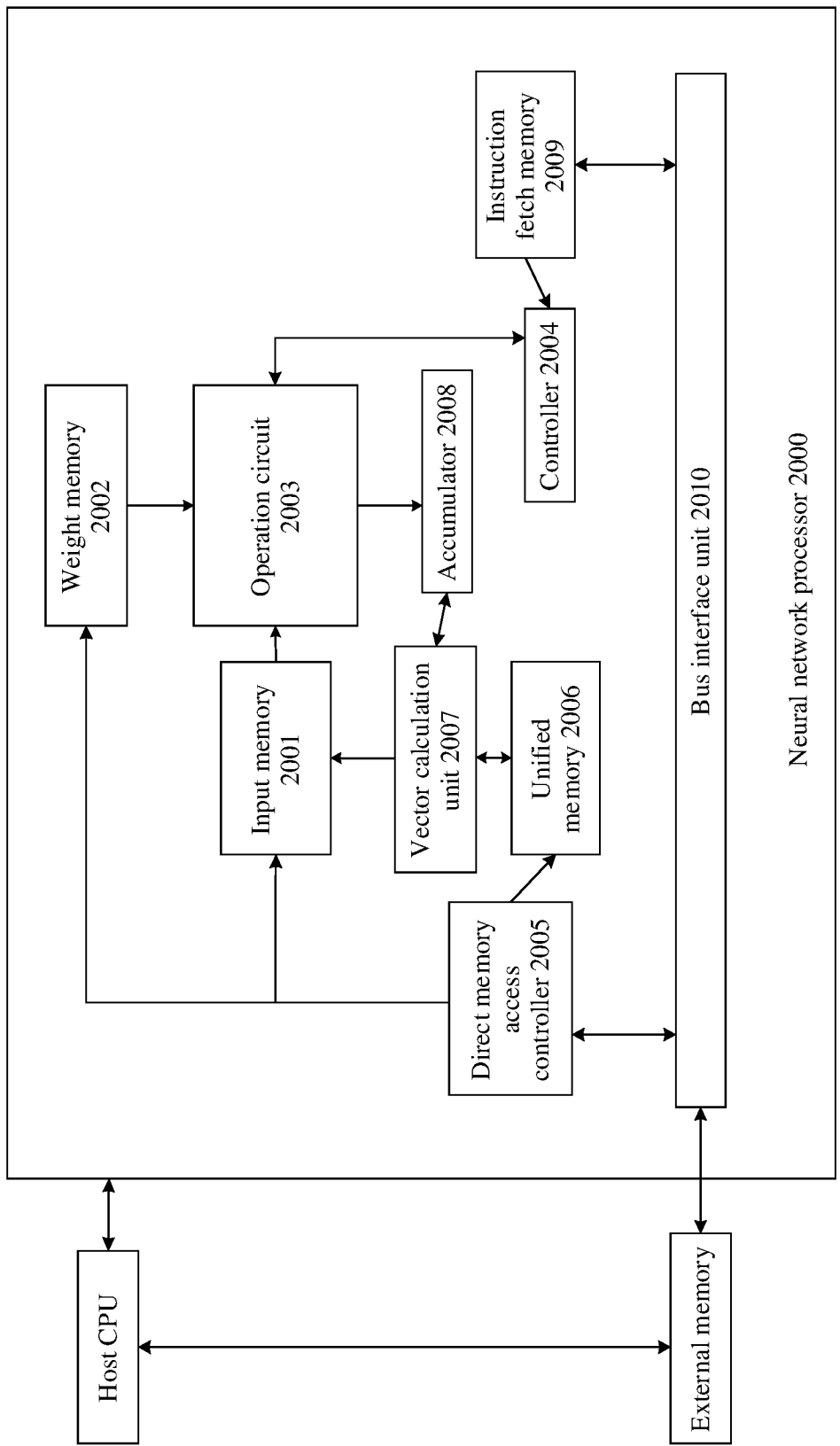
FIG. 9 is a schematic diagram of a structure of a chip according to an embodiment.

FIG. 9 may be a schematic diagram of a structure of a chip according to an embodiment. The chip may be represented as a neural network processor NPU 2000. The NPU 2000 is mounted to a host CPU as a coprocessor, and the host CPU allocates a task for the NPU 2000. A core part of the NPU is an operation circuit 2003, and a controller 2004 controls the operation circuit 2003 to extract matrix data in a memory and perform a multiplication operation.

In some implementations, the operation circuit 2003 internally includes a plurality of processing engines (PEs). In some implementations, the operation circuit 2003 is a two-dimensional systolic array. The operation circuit 2003 may alternatively be a one-dimensional systolic array or another electronic circuit that can perform mathematical operations such as multiplication and addition. In some implementations, the operation circuit 2003 is a general-purpose matrix processor.

For example, it is assumed that there is an input matrix A, a weight matrix B, and an output matrix C. The operation circuit fetches data corresponding to the matrix B from a weight memory 2002 and buffers the data on each PE in the operation circuit. The operation circuit fetches data of the matrix A from an input memory 2001, to perform a matrix operation on the matrix B, and stores an obtained partial result or an obtained final result of the matrix into an accumulator 2008.

A unified memory 2006 is configured to store input data and output data. Weight data is directly transferred to the weight memory 2002 by using a direct memory access controller (DMAC) 2005. The input data is also transferred to the unified memory 2006 by using the DMAC.

BIU is the abbreviation for bus interface unit. A bus interface unit 2010 is configured to perform interaction between an AXI bus, and the DMAC and an instruction fetch buffer (IFB) 2009.

The bus interface unit 2010 (BIU) is configured for the instruction fetch buffer 2009 to obtain instructions from an external memory and is further configured for the direct memory access controller 2005 to obtain raw data of the input matrix A or the weight matrix B from the external memory.

The DMAC is configured to transfer input data in the external memory DDR to the unified memory 2006 or transfer the weight data to the weight memory 2002 or transfer the input data to the input memory 2001.

A vector calculation unit 2007 includes a plurality of operation processing units. When necessary, further processing is performed on output of the operation circuit, such as vector multiplication, vector addition, an exponential operation, a logarithmic operation, or value comparison. The vector calculation unit 2007 is configured to perform network computing, such as batch normalization, pixel-level summation, and upsampling of a feature plane, on a non-convolutional/fully-connected layer in a neural network.

In some implementations, the vector calculation unit 2007 can store a processed output vector in the unified memory 2006. For example, the vector calculation unit 2007 may apply a linear function or a non-linear function to the output of the operation circuit 2003, for example, perform linear interpolation on a feature plane extracted at a convolutional layer. For another example, the linear function or the non-linear function is applied to a vector of an accumulated value to generate an activation value. In some implementations, the vector calculation unit 2007 generates a normalized value, a pixel-level sum, or a normalized value and a pixel-level sum. In some implementations, the processed output vector can be used as activation input of the operation circuit 2003, for example, to be used in a subsequent layer in the neural network.

The instruction fetch buffer 2009 connected to the controller 2004 is configured to store instructions used by the controller 2004.

The unified memory 2006, the input memory 2001, the weight memory 2002, and the instruction fetch buffer 2009 are all on-chip memories. The external memory is private to the NPU hardware architecture.

The processor mentioned anywhere above may be a general-purpose central processing unit, a microprocessor, an ASIC, or one or more processors configured to control an integrated circuit to:

obtain a neural network model and a plurality of training images;

perform feature extraction on the plurality of training images by using the neural network model to obtain a plurality of target features;

perform a plurality of times of first clustering processing on the plurality of training images based on the plurality of target features to obtain a plurality of first clustering results, where each of the plurality of first clustering results corresponds to one silhouette coefficient, and the silhouette coefficient indicates clustering quality;

determine a first target clustering result from the plurality of first clustering results based on a plurality of silhouette coefficients corresponding to the plurality of first clustering results, where the first target clustering result includes M clustering categories; and perform second clustering processing on the plurality of training images based on the plurality of target features to obtain a second clustering result, and update a parameter of the neural network model according to a first loss function, where a quantity of clustering categories included in the second clustering result is M.

Optionally, the silhouette coefficient is calculated based on a degree of inter-category separation and a degree of intra-category cohesion. The degree of inter-category separation indicates a distance between different clustering categories. The degree of intra-category cohesion indicates a distance between different training images corresponding to a same clustering category.

Optionally, a silhouette coefficient corresponding to the first target clustering result is greater than a silhouette coefficient corresponding to a clustering result other than the first target clustering result in the plurality of first clustering results.

Optionally, the performing a plurality of times of first clustering processing on the plurality of training images based on the plurality of target features includes:

performing the plurality of times of first clustering processing on the plurality of training images based on the plurality of target features and updating the parameter of the neural network model according to a second loss function after each time of first clustering processing.

Optionally, the updating the parameter of the neural network model according to a second loss function after each time of first clustering processing includes:

updating the parameter of the neural network model according to the second loss function after each time of first clustering processing, to reduce, in a first clustering result obtained after a next time of first clustering processing, a variance of first similarity distribution between each of the plurality of training images and a plurality of clustering categories included in the first clustering result.

Optionally, the plurality of times of first clustering processing may include an $i^{th}$ time of clustering processing and a $j^{th}$ time of clustering processing; the $j^{th}$ time of clustering processing is after the $i^{th}$ time of clustering processing; and the performing a plurality of times of first clustering processing on the plurality of training images based on the plurality of target features includes:

obtaining a second similarity between all of the plurality of target features when the $i^{th}$ time of clustering processing and the $j^{th}$ time of clustering processing are performed, where the second similarity includes image feature similarities and spatio-temporal constraint weights that are between each of the plurality of target features, a spatio-temporal constraint weight when the $j^{th}$ clustering processing is performed is greater than a spatio-temporal constraint weight when the $i^{th}$ clustering processing is performed, and a spatio-temporal constraint weight indicates a capability of affecting the second similarity between the target features by a spatio-temporal constraint; and performing the $i^{th}$ time of clustering processing and the $j^{th}$ time of clustering processing on the plurality of training images based on the second similarity, where i and j are positive integers.

Optionally, the performing a plurality of times of first clustering processing on the plurality of training images based on the plurality of target features includes:

obtaining the second similarity between all of the plurality of target features when the $i^{th}$ time of clustering processing and the $j^{th}$ time of clustering processing are performed, where the second similarity includes the image feature similarities and the spatio-temporal constraint weights that are between each of the plurality of target features; and performing the plurality of times of first clustering processing on the plurality of training images based on the second similarity and updating the spatio-temporal constraint weights between all of the plurality of target features based on a corresponding first clustering result after each time of first clustering processing.

Optionally, the second loss function includes a triplet loss function.

Optionally, the updating a parameter of the neural network model according to a first loss function includes:

updating the parameter of the neural network model according to the triplet loss function and the second loss function, to reduce, in a second clustering result obtained after a next time of second clustering processing, a variance of first similarity distribution between each of the plurality of training images and a plurality of clustering categories included in the second clustering result, and increase a distance between different clustering categories in the second clustering result obtained after the next time of clustering processing.

In addition, it should be noted that the described apparatus embodiment is merely an example. The units described as separate parts may or may not be physically separate; and parts displayed as units may or may not be physical units, may be located in one position, or may be distributed on a plurality of network units. Some or all the modules may be selected according to actual needs to achieve the objectives of the solutions of embodiments. In addition, in the accompanying drawings of the apparatus embodiments, connection relationships between modules indicate that the modules have communication connections with each other, which may be implemented as one or more communication buses or signal cables.

Based on the description of the foregoing implementations, a person skilled in the art may clearly understand that the embodiments may be implemented by software in addition to necessary universal hardware, or by dedicated hardware, including a dedicated integrated circuit, a dedicated CPU, a dedicated memory, a dedicated component, and the like. Generally, any function that can be performed by a computer program can be easily implemented by using corresponding hardware. Moreover, a hardware structure used to achieve a same function may be in various forms, for example, in a form of an analog circuit, a digital circuit, or a dedicated circuit. However, a software program implementation may be a better implementation. Based on such an understanding, the solutions essentially or the part contributing to the conventional technology may be implemented in a form of a software product. The computer software product is stored in a readable storage medium, for example, a floppy disk, a USB flash drive, a removable hard disk, a ROM, a RAM, a magnetic disk, or an optical disc of a computer, and includes several instructions for instructing a computer device (which may be a personal computer, a training device, or a network device) to perform the method described in the embodiments.

All or some of foregoing embodiments may be implemented by using software, hardware, firmware, or any combination thereof. When the software is used to implement embodiments, all or some of embodiments may be implemented in a form of a computer program product.

The computer program product includes one or more computer instructions. When the computer program instructions are loaded and executed on the computer, all or some of the procedures or functions in the embodiments are generated. The computer may be a general-purpose computer, a dedicated computer, a computer network, or other programmable apparatuses. The computer instructions may be stored in the computer-readable storage medium or may be transmitted from a computer-readable storage medium to another computer-readable storage medium. For example, the computer instructions may be transmitted from a website, computer, training device, or data center to another website, computer, training device, or data center in a wired (for example, a coaxial cable, an optical fiber, or a digital subscriber line (DSL)) or wireless (for example, infrared, radio, or microwave) manner. The computer-readable storage medium may be any usable medium stored by the computer, or a data storage device, such as a training device or a data center, integrating one or more usable media. The usable medium may be a magnetic medium (for example, a floppy disk, a hard disk, or a magnetic tape), an optical medium (for example, a DVD), a semiconductor medium (for example, a solid-state disk (SSD)), or the like.

The invention claimed is:

1. A model update method, comprising:
obtaining a neural network model and a plurality of training images;
performing feature extraction on the plurality of training images by using the neural network model to obtain a plurality of target features;
performing a plurality of times of first clustering processing on the plurality of training images based on the plurality of target features to obtain a plurality of first clustering results, wherein each first clustering result of the plurality of first clustering results corresponds to one silhouette coefficient, and the silhouette coefficient indicates clustering quality related to a degree of inter-category separation and a degree of intra-category cohesion;
determining a first target clustering result from the plurality of first clustering results based on a plurality of silhouette coefficients corresponding to the plurality of first clustering results, wherein the first target clustering result comprises M clustering categories; and
performing second clustering processing on the plurality of training images based on the plurality of target features to obtain a second clustering result, and updating a parameter of the neural network model according to a first loss function, wherein a quantity of clustering categories comprised in the second clustering result is M.

2. The model update method according to claim 1, wherein the silhouette coefficient is calculated based on a degree of inter-category separation and a degree of intra-category cohesion, the degree of inter-category separation indicates a distance between different clustering categories, and the degree of intra-category cohesion indicates a distance between different training images corresponding to a same clustering category.

3. The model update method according to claim 1, wherein a silhouette coefficient corresponding to the first target clustering result is greater than a silhouette coefficient corresponding to a clustering result other than the first target clustering result in the plurality of first clustering results.

4. The model update method according to claim 1, wherein performing the plurality of times of first clustering processing on the plurality of training images based on the plurality of target features further comprises:
performing the plurality of times of first clustering processing on the plurality of training images based on the plurality of target features; and
updating the parameter of the neural network model according to a second loss function after each time of first clustering processing.

5. The model update method according to claim 4, wherein updating the parameter of the neural network model according to the second loss function after each time of first clustering processing further comprises:
updating the parameter of the neural network model according to the second loss function after each time of first clustering processing, to reduce, in a first clustering result obtained after a next time of first clustering processing, a variance of first similarity distribution between each of the plurality of training images and a plurality of clustering categories comprised in the first clustering result.

6. The model update method according to claim 1, wherein the plurality of times of first clustering processing comprise an $i^{th}$ time of clustering processing and a $j^{th}$ time of clustering processing; the $j^{th}$ time of clustering processing is after the $i^{th}$ time of clustering processing; and performing the plurality of times of first clustering processing on the plurality of training images based on the plurality of target features further comprises:

obtaining a second similarity between all of the plurality of target features when the $i^{th}$ time of clustering processing and the $j^{th}$ time of clustering processing are performed, wherein the second similarity comprises image feature similarities and spatio-temporal constraint weights that are between each of the plurality of target features, a spatio-temporal constraint weight when the $j^{th}$ clustering processing is performed is greater than a spatio-temporal constraint weight when the $i^{th}$ clustering processing is performed, and a spatio-temporal constraint weight indicates a capability of affecting the second similarity between the target features by a spatio-temporal constraint; and performing the $i^{th}$ time of clustering processing and the $j^{th}$ time of clustering processing on the plurality of training images based on the second similarity, wherein i and j are positive integers.

7. The model update method according to claim 1, wherein performing the plurality of times of first clustering processing on the plurality of training images based on the plurality of target features further comprises:

obtaining a second similarity between all of the plurality of target features when the $i^{th}$ time of clustering processing and the $j^{th}$ time of clustering processing are performed, wherein the second similarity comprises the image feature similarities and spatio-temporal constraint weights that are between each of the plurality of target features; and performing the plurality of times of first clustering processing on the plurality of training images based on the second similarity; and updating the spatio-temporal constraint weights between all of the plurality of target features based on a corresponding first clustering result after each time of first clustering processing.

8. The model update method according to claim 1, wherein the first loss function comprises a triplet loss function.

9. The model update method according to claim 8, wherein updating the parameter of the neural network model according to the first loss function further comprises:

updating the parameter of the neural network model according to the triplet loss function and the second loss function, to reduce, in a second clustering result obtained after a next time of second clustering processing, a variance of first similarity distribution between each of the plurality of training images and a plurality of clustering categories comprised in the second clustering result, and increase a distance between different clustering categories in the second clustering result obtained after the next time of clustering processing.

10. A model update apparatus, comprising:
one or more processors; and
a non-transitory computer-readable storage medium coupled to the one or more processors and storing programming code for execution by the one or more processors, wherein the programming code, when executed by the one or more processors, configures the one or more processors to:
obtain a neural network model and a plurality of training images;

perform feature extraction on the plurality of training images by using the neural network model to obtain a plurality of target features;

perform a plurality of times of first clustering processing on the plurality of training images based on the plurality of target features to obtain a plurality of first clustering results, wherein each first clustering result of the plurality of first clustering results corresponds to one silhouette coefficient, and the silhouette coefficient indicates clustering quality related to a degree of inter-category separation and a degree of intra-category cohesion;

determine a first target clustering result from the plurality of first clustering results based on a plurality of silhouette coefficients corresponding to the plurality of first clustering results, wherein the first target clustering result comprises M clustering categories; and perform second clustering processing on the plurality of training images based on the plurality of target features to obtain a second clustering result, and update a parameter of the neural network model according to a first loss function, wherein a quantity of clustering categories comprised in the second clustering result is M.

11. The model update apparatus according to claim 10, wherein the silhouette coefficient is calculated based on a degree of inter-category separation and a degree of intra-category cohesion, the degree of inter-category separation indicates a distance between different clustering categories, and the degree of intra-category cohesion indicates a distance between different training images corresponding to a same clustering category.

12. The model update apparatus according to claim 10, wherein a silhouette coefficient corresponding to the first target clustering result is greater than a silhouette coefficient corresponding to a clustering result other than the first target clustering result in the plurality of first clustering results.

13. The model update apparatus according to claim 10, wherein the one or more processors are further configured to:

perform the plurality of times of first clustering processing on the plurality of training images based on the plurality of target features, and update the parameter of the neural network model according to a second loss function after each time of first clustering processing.

14. The model update apparatus according to claim 13, wherein the one or more processors are further configured to:

update the parameter of the neural network model according to the second loss function after each time of first clustering processing, to reduce, in a first clustering result obtained after a next time of first clustering processing, a variance of first similarity distribution between each of the plurality of training images and a plurality of clustering categories comprised in the first clustering result.

15. The model update apparatus according to claim 10, wherein the plurality of times of first clustering processing comprises an $i^{th}$ time of clustering processing and a $j^{th}$ time of clustering processing; the $j^{th}$ time of clustering processing is after the $i^{th}$ time of clustering processing; and the one or more processors are further configured to:

obtain a second similarity between all of the plurality of target features when the $i^{th}$ time of clustering processing and the $j_{th}$ time of clustering processing are performed, wherein the second similarity comprises image feature similarities and spatio-temporal constraint weights that are between each of the plurality of target features, a spatio-temporal constraint weight when the $j^{th}$ clustering processing is performed is greater than a spatio-temporal constraint weight when the $i^{th}$ clustering processing is performed, and a spatio-temporal constraint weight indicates a capability of affecting the second similarity between the target features by a spatio-temporal constraint; and perform the $i^{th}$ time of clustering processing and the $j^{th}$ time of clustering processing on the plurality of training images based on the second similarity, wherein i and j are positive integers.

16. The model update apparatus according to claim 10, wherein the one or more processors are further configured to:

obtain a second similarity between all of the plurality of target features when the $i^{th}$ time of clustering processing and the $j^{th}$ time of clustering processing are performed, wherein the second similarity comprises the image feature similarities and spatio-temporal constraint weights that are between each of the plurality of target features; and perform the plurality of times of first clustering processing on the plurality of training images based on the second similarity, and update the spatio-temporal constraint weights between all of the plurality of target features based on a corresponding first clustering result after each time of first clustering processing.

17. The model update apparatus according to claim 10, wherein the second loss function comprises a triplet loss function.

18. The model update apparatus according to claim 17, wherein the one or more processors are further configured to:

update the parameter of the neural network model according to the triplet loss function and the second loss function, to reduce, in a second clustering result obtained after a next time of second clustering processing, a variance of first similarity distribution between each of the plurality of training images and a plurality of clustering categories comprised in the second clustering result, and increase a distance between different clustering categories in the second clustering result obtained after the next time of clustering processing.

19. A non-transitory computer-readable storage medium, wherein the non-transitory computer-readable storage medium stores a computer program; and when the computer program runs on a computer, the computer is enabled to perform:

obtaining a neural network model and a plurality of training images;

performing feature extraction on the plurality of training images by using the neural network model to obtain a plurality of target features;

performing a plurality of times of first clustering processing on the plurality of training images based on the plurality of target features to obtain a plurality of first clustering results, wherein each first clustering result of the plurality of first clustering results corresponds to one silhouette coefficient, and the silhouette coefficient indicates clustering quality related to a degree of inter-category separation and a degree of intra-category cohesion;

determining a first target clustering result from the plurality of first clustering results based on a plurality of silhouette coefficients corresponding to the plurality of first clustering results, wherein the first target clustering result comprises M clustering categories; and performing second clustering processing on the plurality of training images based on the plurality of target features to obtain a second clustering result, and updating a parameter of the neural network model according to a first loss function, wherein a quantity of clustering categories comprised in the second clustering result is M.

* * * * *